United States Patent
Cai et al.

(10) Patent No.: US 9,725,556 B2
(45) Date of Patent: Aug. 8, 2017

(54) SULFUR-CONTAINING POLYUREAS AND METHODS OF USE

(71) Applicant: PRC-DeSoto International, Inc., Sylmar, CA (US)

(72) Inventors: Juexiao Cai, Stevenson Ranch, CA (US); Stephen J. Hobbs, Gilbert, AZ (US); Marfi Ito, Culver City, CA (US); Scott Moravek, Mars, PA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 149 days.

(21) Appl. No.: 14/532,034

(22) Filed: Nov. 4, 2014

(65) Prior Publication Data

US 2015/0056397 A1 Feb. 26, 2015

Related U.S. Application Data

(62) Division of application No. 13/239,792, filed on Sep. 22, 2011, now abandoned.

(51) Int. Cl.

| C08G 18/52 | (2006.01) |
|---|---|
| C08G 18/77 | (2006.01) |
| C08G 18/75 | (2006.01) |
| C08G 18/76 | (2006.01) |
| C08G 18/10 | (2006.01) |
| C08G 18/32 | (2006.01) |
| C08G 18/38 | (2006.01) |
| C09J 175/02 | (2006.01) |

(52) U.S. Cl.
CPC ............ *C08G 18/52* (2013.01); *C08G 18/10* (2013.01); *C08G 18/324* (2013.01); *C08G 18/3868* (2013.01); *C08G 18/755* (2013.01); *C08G 18/7621* (2013.01); *C08G 18/775* (2013.01); *C09J 175/02* (2013.01); *C08G 2190/00* (2013.01); *Y10T 428/20* (2015.01)

(58) Field of Classification Search
IPC ............ C08G 18/52,18/775, 18/755, 18/7621, 18/10, 18/324, 18/3868, 18/6685, 2190/00; C09J 175/02; Y10T 428/20
See application file for complete search history.

(56) References Cited

U.S. PATENT DOCUMENTS

| 2,466,963 | A | 4/1949 | Patrick et al. |
|---|---|---|---|
| 3,920,617 | A | 11/1975 | Hirosawa et al. |
| 4,146,688 | A | 3/1979 | Schwindt et al. |
| 4,153,594 | A * | 5/1979 | Wilson, Jr. ............... C08L 71/02 428/34 |
| 4,366,307 | A | 12/1982 | Singh et al. |
| 4,609,762 | A | 9/1986 | Morris et al. |
| 5,225,472 | A | 7/1993 | Cameron et al. |
| 5,912,319 | A | 6/1999 | Zook et al. |
| 5,959,071 | A | 9/1999 | DeMoss et al. |
| 6,172,179 | B1 | 1/2001 | Zook et al. |
| 6,232,401 | B1 | 5/2001 | Zook et al. |
| 6,372,849 | B2 | 4/2002 | DeMoss et al. |
| 6,509,418 | B1 | 1/2003 | Zook et al. |
| 6,875,800 | B2 | 4/2005 | Vanier et al. |
| 6,894,086 | B2 | 5/2005 | Munro et al. |
| 7,009,032 | B2 | 3/2006 | Bojkova et al. |
| 7,438,972 | B2 | 10/2008 | Faler et al. |
| 7,622,548 | B2 | 11/2009 | Rao et al. |
| 7,879,955 | B2 | 2/2011 | Rao et al. |
| 2003/0125500 | A1 | 7/2003 | Watanabe et al. |
| 2005/0033007 | A1 | 2/2005 | Saito et al. |
| 2007/0060731 | A1 | 3/2007 | Wind et al. |
| 2009/0012244 | A1 | 1/2009 | Rao et al. |
| 2009/0124762 | A1 * | 5/2009 | Brown .................. C08G 18/18 525/418 |
| 2010/0184899 | A1 | 7/2010 | Rao et al. |
| 2011/0092639 | A1 | 4/2011 | Rao et al. |
| 2011/0281966 | A1 | 11/2011 | Greszta-Franz et al. |
| 2012/0088895 | A1 * | 4/2012 | Zalich .................. C08G 18/168 528/72 |

FOREIGN PATENT DOCUMENTS

| CA | 1082398 | 7/1980 |
|---|---|---|
| WO | 2010/083957 A1 | 7/2010 |

OTHER PUBLICATIONS

Kumar et al., "Synthetic Ionophores Part 19: Synthesis and Ionophore Character of 2-Aminothiophenol Based Silver Selective Acyclic and Cyclic Receptors", Tetrahedron, 1998, vol. 54, No. 21, p. 5575-5586.

Lomolder et al., "Selectively of Isophorone Diisocyanate in the Urethane Reaction Influence of Temperature, Catalysis, and Reaction Partners", J. Coatings Technology, 1997, vol. 69, No. 868, p. 51-57.

Szczygelska-Tao et al., "New Chromogenic Azothiacrown Ethers—Synthesis and Properties", Polish J. Chem., 2002, vol. 76, No. 7, p. 931-936.

* cited by examiner

*Primary Examiner* — Rabon Sergent

(74) *Attorney, Agent, or Firm* — William R. Lambert

(57) ABSTRACT

Sulfur-containing polyurea compositions comprising a polyisocyanate and a polyamine are disclosed. The polyisocyanate comprises the reaction product of reactants comprising a diisocyanate having isocyanate groups with different reactivities toward thiol groups, and a thiol-terminated sulfur-containing polymer such as a thiol-terminated polythioether polymer and/or a thiol-terminated polyformal polymer. The polyamine can be an aromatic polyamine and/or an aromatic amine-terminated polythioether adduct. The sulfur-containing polyurea compositions are useful as aerospace sealants.

20 Claims, 1 Drawing Sheet

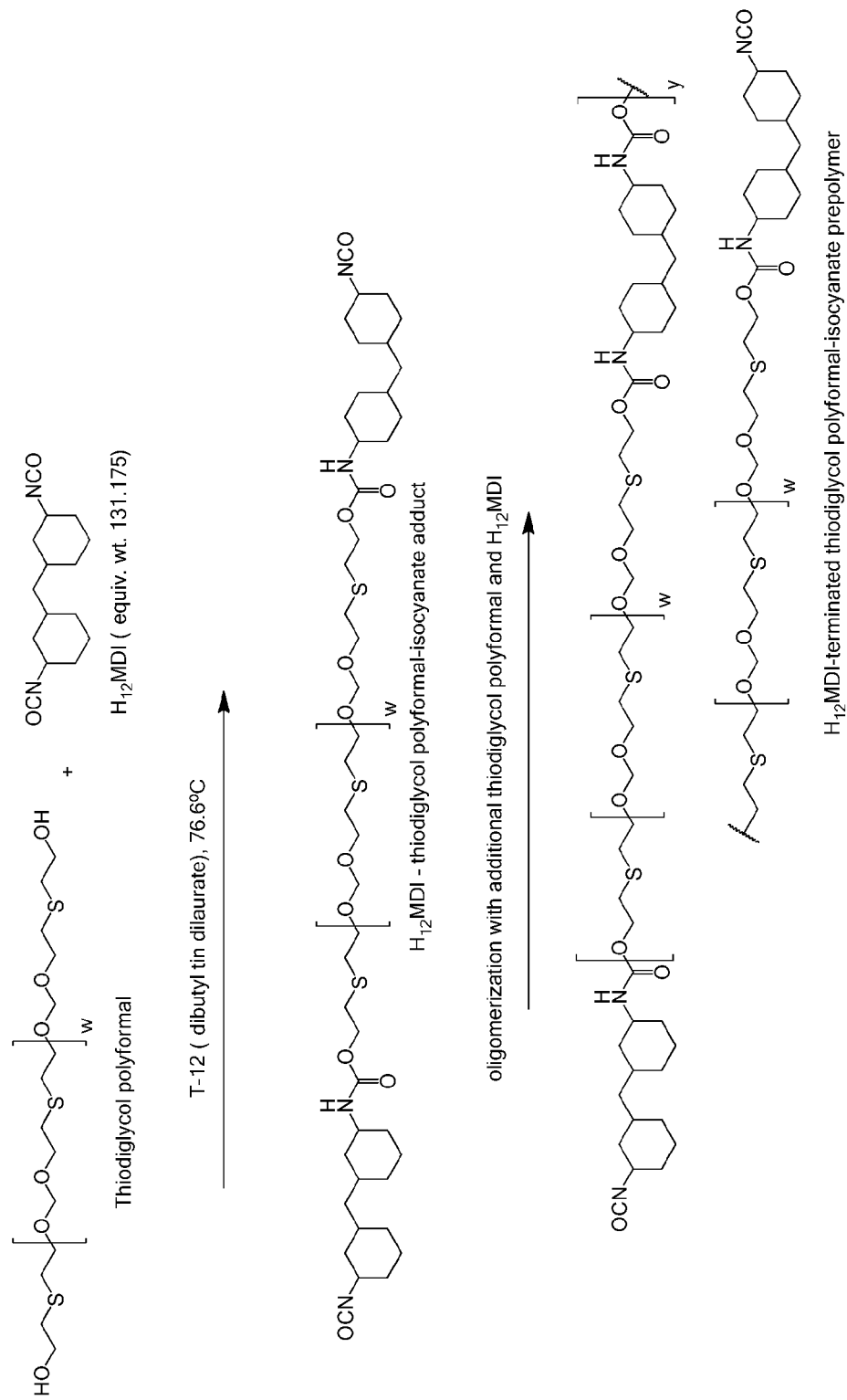

SULFUR-CONTAINING POLYUREAS AND METHODS OF USE

This application is a divisional application of U.S. patent application Ser. No. 13/239,792 filed Sep. 22, 2011, entitled: "SULFUR-CONTAINING POLYUREAS AND METHODS OF USE".

The present disclosure relates to sulfur-containing polyurea compositions and to methods of using the compositions as sealants, and in particular, as low-specific gravity aerospace sealants.

Isocyanate-terminated sulfur-containing prepolymers are useful in aviation and aerospace sealant applications. When cured with aromatic amines and/or aromatic amine-terminated adducts, the resulting cured compositions exhibit long pot life, high elongation and tensile strength, and excellent fuel resistance.

U.S. Pat. No. 7,879,955 discloses polyurea systems consisting of two parts: one part containing an isocyanate-terminated polythioether prepolymer derived from the reaction of a polythiol with a modified diphenylmethane diisocyanate (modified MDI); and a second part containing an amine-terminated polythioether. Despite the cured system exhibiting excellent fuel resistance and elongation and tensile strength, the pot life of the mixed composition tends to be short, for example, less than about 5 minutes. The short pot life and concomitant high viscosity requires the use of special mixing equipment, which limits the usefulness of the system. The short pot life is believed to be due to large amounts of unreacted monomeric isocyanate and monomeric amine in the formulation. For example, the above-referenced patents disclose methods of forming isocyanate-terminated polythioethers by reacting 1 mole of a thiol-terminated polythioether with 8 moles of methylene diphenyl diisocyanate (MDI), which results in a large excess of free, unreacted MDI monomer in the reaction product. In addition, the above-referenced patents disclose methods of forming amine-terminated polythioethers by reacting 1 mole of an epoxy-terminated polythioether with 2 moles of dimethylthiotoluene (Ethacure® 300) at 180° F. for 8 hours. Under such conditions, a significant amount of unreacted aromatic amine remains. When the two-part system is mixed, the free MDI rapidly reacts with the free aromatic amine, resulting in the short pot life for the system. A polyurea composition having longer pot life would eliminate the need for special mixing equipment when applying the formulation.

In IPDI-based isocyanate systems, the differential reactivity of the primary and secondary isocyanates can be controlled by catalyst selection. For example, base catalysts such as triethylamine and trioctylphosphine promote reaction of a thiol with the primary isocyanate at about twice the rate of the secondary isocyanate. The use of tri(acetylacetonato) Iron(III) (Fe(acac)$_3$) as the catalyst in hydroxyl systems (e.g., systems in which the polyisocyanate is reacted with a hydroxyl-terminated adduct) inverts the reactivity such that the secondary isocyanate reacts at about twice the rate of the primary isocyanate, Lomölder et al., *J Coatings Technology* 1997, 69(868), 51-57; U.S. Application Publication No. 2003/0125500. This behavior results in a more controlled reaction chemistry.

Longer pot life of polyurea compositions may be realized by eliminating the free isocyanate in the isocyanate-terminated prepolymer and the free amine in the amine-terminated polythioether. To eliminate free isocyanate in the isocyanate-terminated polythioether component, an aromatic diisocyanate having a first isocyanate group and a second isocyanate group, wherein the reactivity of the first isocyanate group with a thiol group is greater than the reactivity of the second isocyanate group with the thiol group such as toluene diisocyanate or isophorone diisocyanate is reacted with a thiol-terminated sulfur-containing polymer under controlled reaction conditions using a metal acetylacetonate catalyst. To eliminate free amine in the amine-terminated polythioether component, the reaction conditions are controlled such that all of the amine is consumed.

In a first aspect of the present disclosure, compositions are provided comprising: (a) a polyisocyanate prepolymer comprising the reaction product of reactants comprising: (i) a diisocyanate having a first isocyanate group and a second isocyanate group, wherein the reactivity of the first isocyanate group with a thiol group is greater than the reactivity of the second isocyanate group with the thiol group; and (ii) a thiol-terminated sulfur-containing polymer; wherein the molar ratio of isocyanate groups to thiol groups is from about 2.1:1, to about 2.5:1; and (b) a polyamine selected from an aromatic polyamine, an aromatic amine-terminated polythioether adduct, and a combination thereof.

In a second aspect of the present disclosure, sealed apertures that are sealed with a sealant comprising a composition provided by the present disclosure are provided.

In a third aspect of the present disclosure, methods of sealing an aperture are provided comprising applying a sealant comprising a composition provided by the present disclosure to the aperture and curing the applied sealant.

The present disclosure is also directed to methods for making polyisocyanate prepolymers, amine-terminated adducts, and to polyurea compositions comprising a polyisocyanate prepolymer and an aromatic polyamine and/or aromatic amine-terminated adduct.

Those skilled in the art will understand that the drawings, described herein, are for illustration purposes only. The drawings are not intended to limit the scope of the present disclosure.

BRIEF DESCRIPTION OF THE DRAWINGS

FIG. 1 shows an example of a reaction for preparing a 4,4'-methylene dicyclohexyl diisocyanate (H$_{12}$MDI)-terminated thiodiglycol polyformal prepolymer.

A dash ("-") that is not between two letters or symbols is used to indicate a point of bonding for a substituent or between two atoms. For example, —CONH$_2$ is bonded to another chemical moiety through the carbon atom.

"Activated ethylenically unsaturated isocyanate" refers to a compound comprising an ethylenically unsaturated group and an isocyanate group in which the double bond is electron deficient such that it is activated toward Michael addition, i.e., the double bond is a Michael acceptor.

"Aldehyde" refers to a compound of the formula CH(O)R where R is hydrogen or a hydrocarbon group such as an alkyl group, as defined herein. In certain embodiments, the aldehyde is C$_{1-10}$ aldehyde, C$_{1-6}$ aldehyde, C$_{1-4}$ aldehyde, C$_{1-3}$ aldehyde, and in certain embodiments, C$_{1-2}$ aldehyde. In certain embodiments, the aldehyde is formaldehyde. In certain embodiments of the aldehyde, R is selected from hydrogen, C$_{1-6}$ alkyl, C$_{7-12}$ phenylalkyl, substituted C$_{7-12}$ phenylalkyl, C$_{6-12}$ cycloalkylalkyl, substituted C$_{6-12}$ cycloalkylalkyl, C$_{3-12}$ cycloalkyl, substituted C$_{3-12}$ cycloalkyl, C$_{6-12}$ aryl, and substituted C$_{6-12}$ aryl.

"Alkanediyl" refers to a diradical of a saturated, branched or straight-chain, acyclic hydrocarbon group, having, for example, from 1 to 18 carbon atoms (C$_{1-18}$), from 1-14 carbon atoms ($C_{1-14}$), from 1-6 carbon atoms ($C_{1-6}$), from 1 to 4 carbon atoms ($C_{1-4}$), or from 1 to 3 hydrocarbon atoms ($C_{1-3}$). In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. In certain embodiments, each aryl and/or arenediyl group(s) is $C_{6-12}$, $C_{6-10}$, and in certain embodiments, phenyl or benzenediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanearene group is $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, and in certain embodiments, $C_{6-9}$ alkanearene. Examples of alkanearene groups include diphenyl methane.

"Alkanearenediyl" refers to a diradical of an alkanearene group. In certain embodiments, the alkanearenediyl group is $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, and in certain embodiments, $C_{6-9}$ alkanearenediyl. Examples of alkanearenediyl groups include diphenyl methane-4,4'-diyl.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkoxy" refers to an —OR group where R is alkyl as defined herein. Examples of alkoxy groups include methoxy, ethoxy, n-propoxy, isopropoxy, and n-butoxy. In certain embodiments, the alkoxy group is $C_{1-8}$ alkoxy, $C_{1-6}$ alkoxy, $C_{1-4}$ alkoxy, and in certain embodiments, $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. In certain embodiments, the alkyl group is $C_{2-6}$ alkyl, $C_{2-4}$ alkyl, and in certain embodiments, $C_{2-3}$ alkyl.

Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{2-6}$ alkyl, $C_{2-4}$ alkyl, and in certain embodiments, $C_{2-3}$ alkyl.

"Arenediyl" refers to diradical monocyclic or polycyclic aromatic group. Examples of arenediyl groups include benzene-diyl and naphthalene-diyl. In certain embodiments, the arenediyl group is $C_{6-12}$ arenediyl, $C_{6-10}$ arenediyl, $C_{6-9}$ arenediyl, and in certain embodiments, benzene-diyl.

"Aryl" refers to a monovalent aromatic hydrocarbon radical derived by the removal of one hydrogen atom from a single carbon atom of a parent aromatic ring system. Aryl encompasses 5- and 6-membered carbocyclic aromatic rings, for example, benzene; bicyclic ring systems wherein at least one ring is carbocyclic and aromatic, for example, naphthalene, indane, and tetralin; and tricyclic ring systems wherein at least one ring is carbocyclic and aromatic, for example, fluorene. Aryl encompasses multiple ring systems having at least one carbocyclic aromatic ring fused to at least one carbocyclic aromatic ring, cycloalkyl ring, or heterocycloalkyl ring. For example, aryl includes 5- and 6-membered carbocyclic aromatic rings fused to a 5- to 7-membered heterocycloalkyl ring containing one or more heteroatoms chosen from N, O, and S. For such fused, bicyclic ring systems wherein only one of the rings is a carbocyclic aromatic ring, the point of attachment may be at the carbocyclic aromatic ring or the heterocycloalkyl ring. Examples of aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like. In certain embodiments, the aryl group can have from 6 to 20 carbon atoms, and in certain embodiments, from 6 to 12 carbon atoms. Aryl, however, does not encompass or overlap in any way with heteroaryl, separately defined herein. Hence, a multiple ring system in which one or more carbocyclic aromatic rings is fused to a heterocycloalkyl aromatic ring, is heteroaryl, not aryl, as defined herein. In certain embodiments, an aryl group is phenyl.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon monoradical group. In certain embodiments, the cycloalkyl group is $C_{3-12}$ cycloalkyl, $C_{3-8}$ cycloalkyl, $C_{3-6}$ cycloalkyl, and in certain embodiments, $C_{5-6}$ cycloalkyl.

"Cycloalkylalkyl" refers to an alkyl group in which one of the hydrogen atoms is replaced with a cycloalkyl group. In certain embodiments of the cycloalkylalkyl group, a hydrogen atom on the terminal carbon atom of an alkyl group is replaced with a cycloalkyl group. In certain embodiments of cycloalkylalkyl, the cycloalkyl group is a $C_{3-6}$ cycloalkyl group, in certain embodiments a $C_{5-6}$ cycloalkyl group, and in certain embodiments, a cyclopropyl, a cyclobutyl, a cyclopentyl, or a cyclohexyl group. In certain embodiments, the alkanediyl portion of a cycloalkylalkyl group may be, for example, $C_{1-10}$ alkanediyl, $C_{1-6}$ alkanediyl, $C_{1-4}$ alkanediyl, $C_{1-3}$ alkanediyl, propane-1,3-diyl, ethane-1,2-diyl, or methane-diyl. In certain embodiments, the cycloalkylalkyl group is $C_{4-16}$ cycloalkylalkyl, $C_{4-12}$ cycloalkylalkyl, $C_{4-10}$ cycloalkylalkyl, $C_{6-12}$ cycloalkylalkyl, or $C_{6-9}$ cycloalkylalkyl. For example, $C_{6-9}$ cycloalkylalkyl includes a $C_{1-3}$ alkyl group bonded to a cyclopentyl or a cyclohexyl group.

"Cycloalkylalkane" group refers to a saturated, branched or straight-chain, acyclic hydrocarbon group in which one of the hydrogen atoms is replaced with a cycloalkane group. In certain embodiments of the cycloalkylalkane group, a hydrogen atom on the terminal carbon atom of a linear alkane group is replaced with a cycloalkyl group. In certain embodiments the cycloalkyl group is a $C_{3-6}$ cycloalkyl group, in certain embodiments a $C_{5-6}$ cycloalkyl group, and in certain embodiments a cyclopropyl, a cyclobutyl, a cyclopentyl, or a cyclohexyl group. The alkane portion of a cycloalkylalkane group may be, for example, $C_{1-10}$ alkane, $C_{1-6}$ alkane, $C_{1-4}$ alkane, $C_{1-3}$ alkane, propane, ethane, or methane. In certain embodiments, a cycloalkylalkane group is $C_{4-16}$ cycloalkylalkane, $C_{4-12}$ cycloalkylalkane, $C_{4-10}$ cycloalkylalkane, $C_{6-12}$ cycloalkylalkane, or $C_{6-9}$ cycloalkylalkane. For example, $C_{6-9}$ cycloalkylalkane includes a $C_{1-3}$ alkyl group bonded to a cyclopentyl or a cyclohexyl group.

"Group derived from a diisocyanate" refers to a group in which one or both of the terminal isocyanate groups of a parent diisocyanate form a urethane (—O—C(O)—N(R)—), thiourethane (—S—C(O)—N(R)—), or urea linkage (—N(R)—C(O)—N(R)—). The group derived from a diisocyanate includes groups derived from aliphatic diisocyanates and groups derived from aromatic diisocyanates. In certain embodiments, the group derived from a diisocyanate is a group derived from an aliphatic diisocyanate, and in certain embodiments a group derived from a diisocyanate is a group derived from an aromatic diisocyanate. For example, a group derived from 2,6-diisocyanatotoluene has the structure:

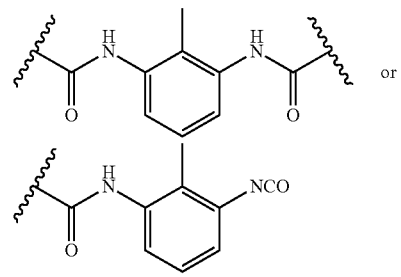

where the group is bonded to a —O—, —S—, or —NR— group, and results from the reaction of an isocyanate group with a hydroxyl group, a thiol group, or an amine group.

Examples of aliphatic diisocyanates include, 1,6-hexamethylene diisocyanate, 1,5-diisocyanato-2-methylpentane, methyl-2,6-diisocyanatohexanoate, bis(isocyanatomethyl)cyclohexane, 1,3-bis(isocyanatomethyl)cyclohexane, 2,2,4-trimethylhexane 1,6-diisocyanate, 2,4,4-trimethylhexane 1,6-diisocyanate, 2,5(6)-bis(isocyanatomethyl)cyclo[2.2.1.]heptane, 1,3,3-trimethyl-1-(isocyanatomethyl)-5-isocyanatocyclohexane, 1,8-diisocyanato-2,4-dimethyloctane, octahydro-4,7-methano-H-indenedimethyl diisocyanate, and 1,1'-methylenebis(4-isocyanatocyclohexane), and 4,4'-methylene dicyclohexyl diisocyanate ($H_{12}$MDI). Examples of aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanatonaphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, and 2,4,6-triisopropyl-m-phenylene diisocyanate.

Examples of aromatic diisocyanates in which the isocyanate groups are not bonded directly to the aromatic ring include, bis(isocyanatoethyl)benzene, α,α,α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl)phthalate, and 2,5-di(isocyanatomethyl)furan. Aromatic diisocyanates having isocyanate groups bonded directly to the aromatic ring include phenylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, 4,4'-diphenylmethane diisocyanate, p-phenylene diisocyanate, 2,4-toluene diisocyanate, and 2,6-toluene diisocyanate.

Examples of alicyclic diisocyanates include isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo[2.2.1]-heptane.

"Group derived from an activated ethylenically unsaturated monoisocyanate" refers to a group in which the isocyanate group of a parent activated ethylenically unsaturated monoisocyanate forms a urethane, thiourethane or urea linkage and the activated ethylenically unsaturated group is bonded to another moiety or that is not bonded to another moiety. In certain embodiments, a group derived from an activated ethylenically unsaturated isocyanate refers to a group in which an isocyanate group of a parent activated ethylenically unsaturated monoisocyanate forms a urethane, thiourethane or urea linkage and the activated ethylenically unsaturated group is not bonded to another moiety. For example, a group derived from the activated ethylenically unsaturated monoisocyanate 2-isocyanatoethyl methacrylate can have the structure:

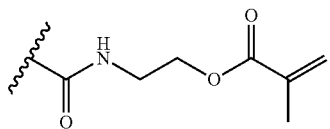 [SMILES: *C(=O)NCCOC(=O)C(=C)C]

where the carbonyl is bonded to —O—, —S—, or —NR— to form a urethane, thiourethane or urea group, respectively. In certain embodiments, a group derived from an ethylenically unsaturated isocyanate refers to a group in which an isocyanate group of a parent ethylenically unsaturated monoisocyanate forms a urethane, thiourethane or urea linkage and the ethylenically unsaturated group is bonded to another moiety. For example, in such embodiments, a group derived from the activated ethylenically unsaturated monoisocyanate 2-isocyanatoethyl methacrylate has the structure:

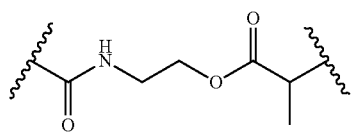 [SMILES: *C(=O)NCCOC(=O)C(*)C]

where the carbonyl is bonded to —O—, —S—, or —NR— to form a urethane, thiourethane or urea group, and the former vinyl group is bonded to another moiety.

Groups that are reactive with an epoxy group include amine groups. In such embodiments, a group V comprising a group that is reactive with an epoxy group can have the formula —V—NH$_2$; and a moiety resulting from the reaction of V with an epoxy group can have the formula —V—NH—CH$_2$—CH(OH)—.

"Heteroalkanediyl" refers to an alkanediyl group in which one or more of the carbon atoms are replaced with a heteroatom, such as N, O, S, or P. In certain embodiments of heteroalkanediyl, the heteroatom is selected from N and O.

"Heteroarenediyl" refers to an arenediyl group in which one or more of the carbon atoms are replaced with a heteroatom, such as N, O, S, or P. In certain embodiments of heteroarenediyl, the heteroatom is selected from N and O.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

"Heteroalkanearenediyl" refers to an alkanearenediyl group in which one or more of the carbon atoms are replaced with a heteroatom, such as N, O, S, or P. In certain embodiments of heteroalkanearenediyl, the heteroatom is selected from N and O.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

"Ketone" refers to a compound of the formula $CO(R)_2$, where each R is a hydrocarbon group. In certain embodiments of a ketone, each R is independently selected from $C_{1-6}$ alkyl, $C_{7-12}$ phenylalkyl, substituted $C_{7-12}$ phenylalkyl, $C_{6-12}$ cycloalkylalkyl, and substituted $C_{6-12}$ cycloalkylalkyl. In certain embodiments of the ketone, each R is independently selected from methyl, ethyl, and propyl. In certain embodiments, the ketone is selected from propan-2-one, butan-2-one, pentan-2-one, and pentan-3-one.

"Oxyalkanediyl" refers to an alkanediyl group in which one or more of the carbon atoms and certain atoms or groups bonded to the one or more carbon atom are replaced with an oxygen atom. In certain embodiments of oxyalkanediyl, the oxygen atoms will not be adjacent to other oxygen atoms. In certain embodiments, oxyalkanediyl is $C_{2-10}$ oxyalkanediyl, $C_{2-8}$ oxyalkanediyl, $C_{2-6}$ oxyalkanediyl, and in certain embodiments, $C_{2-4}$ oxyalkanediyl.

"Phenylalkyl" refers to an alkyl group in which one of the hydrogen atoms is replaced with a phenyl group. In certain embodiments of phenylalkyl, one of the hydrogen atoms of the terminal carbon atom of a linear alkyl group is replaced with a phenyl group. In certain embodiments, the phenylalkyl group is $C_{7-12}$ phenylalkyl, $C_{7-10}$ phenylalkyl, $C_{7-9}$ phenylalkyl, and in certain embodiments, benzyl.

As used herein, "polymer" refers to oligomers, homopolymers, and copolymers. Unless stated otherwise, molecular weights are number average molecular weights for polymeric materials indicated as "Mn" as determined, for example, by gel permeation chromatography using a polystyrene standard in an art-recognized manner.

As indicated, certain embodiments provided by the present disclosure relate to flexible amine-terminated, sulfur-containing adducts. Sulfur-containing polymers include polythioethers, polydisulfides, and polymers containing both thioether and disulfide groups. Polythioether generally refers to a polymer containing at least two thioether groups, e.g., two —C—S—C— groups. Polydisulfide refers to a polymer containing at least two disulfide groups, e.g., two —C—S—S—C— groups. In addition to at least two thioether and/or disulfide groups, sulfur-containing polymers provided by the present disclosure may comprise at least two formal, acetal, and/or ketal groups, e.g., at least two —O—C(R)$_2$—O— groups, where each R is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl.

"Substituted" refers to a group in which one or more hydrogen atoms are each independently replaced with the same or different substituent(s). In certain embodiments, the substituent is selected from halogen, —S(O)$_2$OH, —S(O)$_2$, —SH, —SR where R is C$_{1-6}$ alkyl, —COOH, —NO$_2$, —NR$_2$ where each R is independently selected from hydrogen and C$_{1-3}$ alkyl, —CN, =O, C$_{1-6}$ alkyl, —CF$_3$, —OH, phenyl, C$_{2-6}$ heteroalkyl, C$_{5-6}$ heteroaryl, C$_{1-6}$ alkoxy, and —COR where R is C$_{1-6}$ alkyl. In certain embodiments, the substituent is chosen from —OH, —NH$_2$, and C$_{1-3}$ alkyl.

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

Reference is now made to certain embodiments of polymers, compositions, and methods. The disclosed embodiments are not intended to be limiting of the claims. To the contrary, the claims are intended to cover all alternatives, modifications, and equivalents.

In certain embodiments, compositions provided by the present disclosure comprise: (a) a polyisocyanate prepolymer comprising the reaction product of reactants comprising: (i) a diisocyanate having a first isocyanate group and a second isocyanate group, wherein the reactivity of the first isocyanate group with a thiol group is greater than the reactivity of the second isocyanate group with the thiol group; and (ii) a thiol-terminated sulfur-containing polymer; wherein the molar ratio of isocyanate groups to thiol groups is from about 2.1:1, to about 2.5:1; and (b) a polyamine selected from an aromatic polyamine, an aromatic amine-terminated polythioether adduct, and a combination thereof.

In certain embodiments, the molar ratio of isocyanate groups to thiol groups is from about 2.1:1 to about 2.4:1; from about 2.1:1 to about 2.3:1, and in certain embodiments, from about 2.1:1 to about 2.2:1. In certain embodiments, the molar ratio of isocyanate groups to thiol groups is about 2.1:1; about 2.2:1; about 2.3:1; about 2.4:1; and in certain embodiments about 2.5:1.

In certain embodiments, a polyisocyanate prepolymer is selected from an isocyanate-terminated polythioether prepolymer, an isocyanate-terminated polyformal prepolymer, and a combination thereof.

In certain embodiments, a polyisocyanate prepolymer comprises an isocyanate-terminated polythioether prepolymer.

In certain embodiments, an isocyanate-terminated polythioether prepolymer is selected from a difunctional isocyanate-terminated polythioether of Formula (1), a multifunctional isocyanate-terminated polythioether of Formula (1'), and a combination thereof:

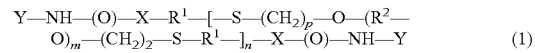

Y—NH—(O)—X—R$^1$—[—S—(CH$_2$)$_p$—O—(R$^2$—O)$_m$—(CH$_2$)$_2$—S—R$^1$—]$_n$—X—(O)—NH—Y  (1)

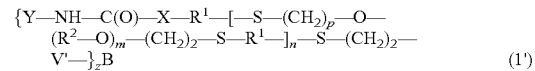

{Y—NH—C(O)—X—R$^1$—[—S—(CH$_2$)$_p$—O—(R$^2$—O)$_m$—(CH$_2$)$_2$—S—R$^1$—]$_n$—S—(CH$_2$)$_2$—V'—}$_z$B  (1')

wherein:
each R$^1$ independently is selected from C$_{2-10}$ alkanediyl, substituted C$_{2-10}$ alkanediyl wherein the substituent groups are selected from C$_{1-3}$ alkyl, C$_{1-3}$ alkoxy, C$_{6-8}$ cycloalkyl, C$_{6-10}$ alkylcycloalkyl, and C$_{5-8}$ heterocycloalkyl, and —[(—CHR$^3$—)$_s$—X'—]$_q$—(—CHR$^3$—)$_r$—, wherein:
  s is an integer from 2 to 6;
  q is an integer from 1 to 5;
  r is an integer from 2 to 10;
  each R$^3$ is independently selected from hydrogen and methyl; and each X' is independently selected from —O—, —S—, and —NHR—, wherein R is selected from hydrogen and methyl;
each R$^2$ is independently selected from C$_{1-10}$ alkanediyl, C$_{6-8}$ cycloalkanediyl, C$_{6-14}$ alkylcycloalkanediyl, and —[(—CHR$^3$—)$_s$—X'—]$_q$—(—CHR$^3$—)$_r$—, wherein s, q, r, R$^3$, and X' are as defined above;
m is an integer from 0 to 50;
n is an integer from 1 to 60;
p is an integer from 2 to 6;
each X is S;
B represents a core of a z-valent polyfunctionalizing agent B(V)$_z$, wherein:
  z in an integer from 3 to 6; and
  each V is a group comprising a terminal vinyl group;
each —S—(CH$_2$)$_2$—V— is a moiety derived from the reaction of V with a thiol; and
each Y—NH—C(O)— is a group derived from the diisocyanate having a first isocyanate group and a second isocyanate group, wherein the reactivity of the first isocyanate group with a thiol group is greater than the reactivity of the second isocyanate group with the thiol group.

Isocyanate-terminated polythioethers of Formula (1) and Formula (1') are disclosed in U.S. Pat. Nos. 7,879,955 and 7,622,548, and include any of the isocyanate-terminated polythioethers disclosed therein, in which a thiol-terminated polythioether is terminated with a diisocyanate having a first isocyanate group and a second isocyanate group, wherein the reactivity of the first isocyanate group with a thiol group is greater than the reactivity of the second isocyanate group with the thiol group.

In certain embodiments, a polyisocyanate prepolymer comprises an isocyanate-terminated polyformal prepolymer.

In certain embodiments, an isocyanate-terminated polyformal prepolymer is selected from a difunctional isocyanate-terminated polyformal of Formula (2), a multifunctional isocyanate-terminated polyformal of Formula (2'), and a combination thereof:

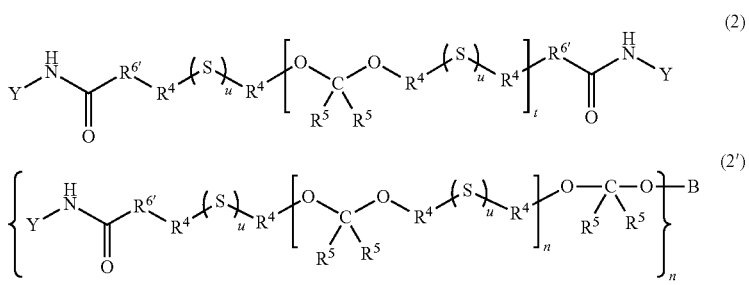

wherein:
t is an integer selected from 1 to 50;
each u is independently selected from 1 and 2;
each $R^4$ is independently selected from $C_{2-6}$ alkanediyl;
each $R^5$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl;
each —$R^{6'}$— is a group derived from a group comprising a terminal thiol group;
B represents a core of a z-valent polyol $B(OH)_z$ wherein z is an integer from 3 to 6; and each Y—NH—C(O)— is a moiety derived from the diisocyanate Y—NCO having a first isocyanate group and a second isocyanate group, wherein the reactivity of the first isocyanate group with a thiol group is greater than the reactivity of the second isocyanate group with the thiol group.

In certain embodiments, diisocyanate Y—NCO is a diisocyanate in which the reactivity of the first isocyanate group toward a thiol group is at least twice the reactivity of the second isocyanate group toward the same thiol group, at least three times the reactivity of the second isocyanate group toward the same thiol group, at least four times the reactivity of the second isocyanate group toward the same thiol group, at least six times the reactivity of the second isocyanate group toward the same thiol group, and in certain embodiments, at least ten times the reactivity of the second isocyanate group toward the same thiol group.

In certain embodiments, diisocyanate Y—NCO is selected from 2,4-toluene diisocyanate, 2,6-toluene diisocyanate, isophorone diisocyanate, and combinations of any of the foregoing. In certain embodiments, diisocyanate Y—NCO is selected from isophorone diisocyanate (IPDI), toluene-2,4-diisocyanate (2,4-TDI), and a combination thereof. In certain embodiments, diisocyanate Y—NCO is isophorone diisocyanate (IPDI) and in certain embodiments is toluene-2,4-diisocyanate (2,4-TDI).

In certain embodiments of an isocyanate-terminated polyformal of Formula (3) and Formula (3'), each —$R^{6'}$— is independently selected from a moiety of Formula (a), Formula (b), Formula (c), Formula (d), Formula (e), Formula (f), Formula (g), and Formula (h):

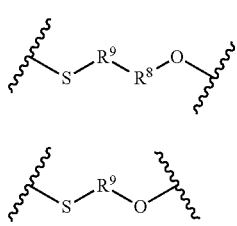

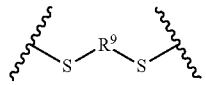

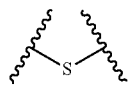

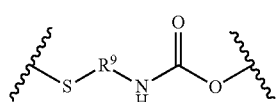

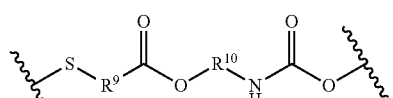

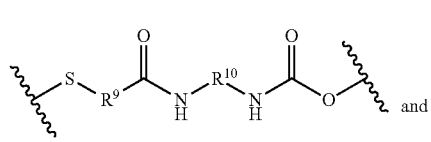

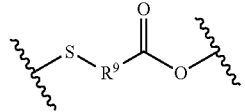

wherein:
each $R^8$ is independently selected from a moiety derived from a diisocyanate and a moiety derived from an ethylenically unsaturated monoisocyanate;
each $R^9$ is independently selected from $C_{2-14}$ alkanediyl and $C_{2-14}$ heteroalkanediyl; and
each $R^{10}$ is independently selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

In certain embodiments, a polyisocyanate prepolymer has a NCO content from about 2.8% to about 3.6%, from about 2.9% to about 3.5%, from about 3.0% to about 3.4%, from about 3.1% to about 3.3%, and in certain embodiments, about 3.2% or about 3.17%.

Thiol-terminated polyformals and isocyanate-terminated polyformals are disclosed in U.S. patent application Ser. Nos. 13/050,988 and 13/051,002 and U.S. Provisional Application No. 61/453,978, filed on Mar. 18, 2011.

Polyisocyanate prepolymers provided by the present disclosure may be prepared by reacting a diisocyanate having a first isocyanate group and a second isocyanate group, wherein the reactivity of the first isocyanate group toward a thiol group is greater than the reactivity of the second isocyanate group toward the same thiol group with a thiol-terminated sulfur-containing polymer.

In certain embodiments, a diisocyanate is selected from a diisocyanate wherein the reactivity of the first isocyanate group toward a thiol group is at least twice the reactivity of the second isocyanate group toward the same thiol group, at least three times the reactivity of the second isocyanate group toward the same thiol group, at least four times the reactivity of the second isocyanate group toward the same thiol group, at least six times the reactivity of the second isocyanate group toward the same thiol group, and in certain embodiments, at least ten times the reactivity of the second isocyanate group toward the same thiol group.

In certain embodiments, the diisocyanate is selected from 2,4-toluene diisocyanate, 2,6-toluene diisocyanate, isophorone diisocyanate, and a combination of any of the foregoing. In certain embodiments, the diisocyanate is selected from isophorone diisocyanate (IPDI), toluene-2,4-diisocyanate (2,4-TDI), and a combination thereof. In certain embodiments the diisocyanate is isophorone diisocyanate (IPDI), and in certain embodiments is toluene-2,4-diisocyanate (2,4-TDI). In certain embodiments, the diisocyanate is 2,4-toluene diisocyanate.

In certain embodiments of a reaction to provide a polyisocyanate prepolymer, the reactants further comprise a base catalyst. In certain embodiments, a base catalyst is selected from triethylamine, trioctylphosphine, and a combination thereof. In certain embodiments, a base catalyst is triethylamine, trioctylphosphine, and in certain embodiments a combination of triethylamine and trioctylphosphine.

In certain embodiments of a reaction to provide a polyisocyanate prepolymer, the reactants further comprise a metal acetylacetonate catalyst. In certain embodiments, the metal acetyalacetonate catalyst is tris(acetylacetonato) Iron(III) (Fe(acac)$_3$).

Thiol-terminated sulfur-containing polymers may be selected from thiol-terminated polythioethers, thiol-terminated polyformals, and combinations thereof.

In certain embodiments, isocyanate-terminated polythioether prepolymers provided by the present disclosure may be prepared by reacting a diisocyanate having a first isocyanate group and a second isocyanate group, wherein the reactivity of the first isocyanate group with a thiol group is greater than the reactivity of the second isocyanate group with the thiol group; and a thiol-terminated polythioether.

In certain embodiments, a thiol-terminated polythioether is selected from a difunctional thiol-terminated polythioether, a multifunctional thiol-terminated polythioether, and a combination thereof.

In certain embodiments, a thiol-terminated polythioether is selected from a thiol-terminated polythioether of Formula (3), a thiol-terminated polythioether of Formula (3'), and a combination thereof:

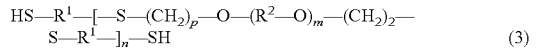

(3)

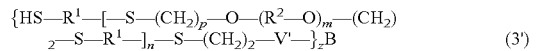

(3')

wherein:
each $R^1$ independently is selected from $C_{2-10}$ alkanediyl, substituted $C_{2-10}$ alkanediyl wherein the substituent groups are selected from $C_{1-3}$ alkyl, $C_{1-3}$ alkoxy, $C_{6-8}$ cycloalkyl, $C_{6-10}$ alkylcycloalkyl, and $C_{5-8}$ heterocycloalkyl, and —[(—CHR$^3$—)$_s$—X'—]$_q$—(—CHR$^3$—)$_r$—, wherein:
  s is an integer from 2 to 6;
  q is an integer from 1 to 5;
  r is an integer from 2 to 10;
  each $R^3$ is independently selected from hydrogen and methyl; and
  each X' is independently selected from —O—, —S—, and —NHR—, wherein R is selected from hydrogen and methyl;
each $R^2$ is independently selected from $C_{1-10}$ alkanediyl, $C_{6-8}$ cycloalkanediyl, $C_{6-14}$ alkylcycloalkanediyl, and —[(—CHR$^3$—)$_s$—X'—]$_q$—(—CHR$^3$—)$_r$—, wherein s, q, r, $R^3$, and X' are as defined above;
m is an integer from 0 to 50;
n is an integer from 1 to 60;
p is an integer from 2 to 6; and
B represents a core of a z-valent, vinyl-terminated polyfunctionalizing agent B(V)$_z$ wherein:
z is an integer from 3 to 6; and
each V is a group comprising a terminal vinyl group; and each —S—(CH$_2$)$_2$—V— is derived from the reaction of V with a thiol.

In certain embodiments, the thiol-terminated polythioether has an average functionality from about 2.05 to about 3.0, from about 2.1 to about 2.6, and in certain embodiments, is about 2.2.

In certain embodiments, a thiol-terminated polythioether comprising the reaction product of reactants comprising:
(a) a dithiol of Formula (4):

$$HS—R^1—SH \qquad (4)$$

wherein:
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^3$)$_s$—X'—]$_q$—(CHR$^3$)$_r$—;
wherein:
  each $R^3$ is independently selected from hydrogen and methyl;
  each X' is independently selected from —O—, —S—, —NH—, and —NR— wherein R is selected from hydrogen and methyl;
  s is an integer from 2 to 6;
  q is an integer from 1 to 5; and
  r is an integer from 2 to 10; and
(b) a divinyl ether of Formula (5):

$$CH_2=CH—O—[—R^2—O\text{-}]_m—CH=CH_2 \qquad (5)$$

wherein:
each $R^2$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and —[(CH$_2$)$_s$—X'—]$_q$—(CH$_2$)$_r$—; wherein
  each X' is independently selected from —O—, —S—, and —NR—,
  wherein R is selected from hydrogen and methyl;
  each s is independently an integer from 2 to 6;
  each q is independently an integer from 0 to 5; and
  each r is independently an integer from 2 to 10; and
each m is independently an integer from 0 to 10.

In certain embodiments of a reaction to form an thiol-terminated polythioether, the thiol-terminated-terminated polythioether comprises the reaction product of reactants further comprising a polyfunctionalizing agent B(R$^{11}$)$_z$, wherein:
B is a core of a z-valent polyfunctionalizing agent B(R$^{11}$)$_z$;

each $R^{11}$ comprises a group selected from a group that is reactive with a terminal —SH group and a group that is reactive with a terminal —CH═CH$_2$ group; and z is independently selected from an integer from 3 to 6.

In certain embodiments, each $R^{11}$ is selected from a vinyl group and a thiol group. In certain embodiments, each $R^{11}$ is a vinyl group, and in certain embodiments, each $R^{11}$ is a thiol group. In certain embodiments, z is 3, in certain embodiments, z is 4, in certain embodiments, z is 5, and in certain embodiments, z is 6. In certain embodiments, the polyfunctionalizing agent comprises a trifunctionalizing agent. In certain embodiments, a polyfunctionalizing agent comprises a vinyl-terminated polyfunctionalizing agent. In certain embodiments, a vinyl-terminated polyfunctionalizing agent comprises triallyl isocyanurate.

In certain embodiments of a reaction to form an isocyanate-terminated prepolymer, a thiol-terminated-terminated polythioether comprises the reaction product of reactants further comprising an alkyl ω-alkenyl ether of Formula (6):

$$CH_2=CH-(CH_2)_s-O-R^{12} \qquad (6)$$

wherein:

s is an integer from 0 to 10; and $R^{12}$ is selected from $C_{1-6}$ alkyl and substituted $C_{1-6}$ alkyl wherein the one or more substituents is selected from —OH and —NHR wherein R is selected from hydrogen and $C_{1-6}$ alkyl.

In certain embodiments, the alkyl ω-alkenyl ether of Formula (6) is 4-hydroxybutyl vinyl ether.

In certain embodiments of a reaction to form an isocyanate-terminated prepolymer, a thiol-terminated polythioether comprises the reaction product of reactants further comprising a polyfunctionalizing agent $B(R^8)_z$ and an alkyl ω-alkenyl ether of Formula (6). In certain embodiments, a thiol-terminated polythioether comprises the reaction product of reactants further comprising triallyl isocyanurate and 4-hydroxybutyl vinyl ether.

In certain embodiments, a thiol-terminated polythioether is selected from a thiol-terminated polythioether of Formula (7), a thiol-terminated polythioether of Formula (7'), and a combination thereof:

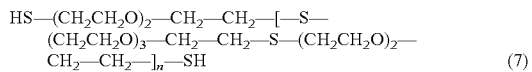
$$HS-(CH_2CH_2O)_2-CH_2-CH_2-[-S-\\(CH_2CH_2O)_3-CH_2-CH_2-S-(CH_2CH_2O)_2-\\CH_2-CH_2-]_n-SH \qquad (7)$$

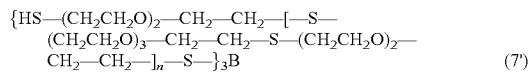
$$\{HS-(CH_2CH_2O)_2-CH_2-CH_2-[-S-\\(CH_2CH_2O)_3-CH_2-CH_2-S-(CH_2CH_2O)_2-\\CH_2-CH_2-]_n-S-\}_3B \qquad (7')$$

wherein B is:

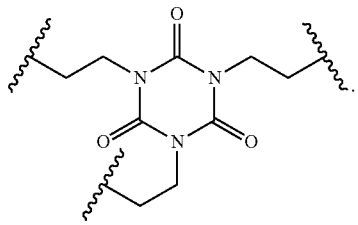 [SMILES: *CCn1c(=O)n(CC*)c(=O)n(CC*)c1=O]

In certain embodiments, a thiol-terminated polythioether comprises the reaction product of reactants comprising:

(a) a dithiol of Formula (4):

$$HS-R^1-SH \qquad (4)$$

wherein:

$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^3$)$_s$—X'—]$_q$—(CHR$^3$)$_r$—;

wherein:

each $R^{17}$ is independently selected from hydrogen and methyl;

each X is independently selected from —O—, —S—, —NH—, and —NR— wherein R is selected from hydrogen and methyl;

s is an integer from 2 to 6;

q is an integer from 1 to 5; and r is an integer from 2 to 10; and (b a hydroxyl-functional vinyl ether of Formula (6):

$$CH_2=CH-(CH_2)_s-O-R^{12} \qquad (6)$$

wherein:

s is an integer from 0 to 10; and $R^{12}$ is selected from $C_{1-6}$ n-alkyl and substituted $C_{1-6}$ n-alkyl wherein the one or more substituents is selected from —OH and —NHR wherein R is selected from hydrogen and $C_{1-6}$ n-alkyl.

Thiol-terminated polythioethers of Formula (3) and Formula (3') may be prepared by a number of methods. For example, in certain embodiments, (n+1) moles of a dithiol of Formula (4):

$$HS-R^1-SH \qquad (4)$$

or a mixture of at least two different dithiols of Formula (4) may be reacted with n moles of a divinyl ether of Formula (5):

$$CH_2=CH-O-[-R^2-O-]_m-CH=CH_2 \qquad (5)$$

or a combination of at least two different divinyl ethers of Formula (5), in the presence of a catalyst. This method affords an uncapped, difunctional thiol-terminated polythioether.

Compounds of Formula (4) are dithiols. In certain embodiments of dithiols of Formula (4), $R^1$ is $C_{2-6}$ n-alkanediyl, such as 1,2-ethanedithiol, 1,3-propanedithiol, 1,4-butanedithiol, 1,5-pentanedithiol, or 1,6-hexanedithiol.

In certain embodiments, $R^1$ is a $C_{3-6}$ branched alkanediyl group, having one or more pendent groups which can be, for example, methyl or ethyl. In certain embodiments, $R^1$ is selected from 1,2-propanedithiol, 1,3-butanedithiol, 2,3-butanedithiol, 1,3-pentanedithiol, and 1,3-dithio-3-methylbutane. In certain embodiments, $R^{15}$ is selected from $C_{6-8}$ cycloalkanediyl and $C_{6-10}$ alkanecycloalkanediyl, such as, for example, dipentenedimercaptan and ethylcyclohexyldithiol (ECHDT).

In certain embodiments, dithiols of Formula (4) comprises one or more heteroatom substituents in the carbon backbone, that is, dithiols in which X' is a heteroatom such as —O—, —S— or another bivalent heteroatom radical; a secondary or tertiary amine group such as —NR—, where R is hydrogen or methyl; or another substituted trivalent heteroatom. In certain embodiments, X' is —O—, —S—, and thus $R^1$ is —[(CH$_2$)$_s$—O-]$_q$—(CH$_2$)$_r$— or —[(—CH$_2$—)$_s$—S-]$_q$—(—CH$_2$—)$_r$—. In certain embodiments, s and r are the same, and in certain embodiments, each of s and r is 2. In certain embodiments, a dithiol of Formula (4) are selected from dimercaptodiethylsulfide (DMDS) (each of p and r is 2; q is 1; X' is S); dimercaptodioxaoctane (DMDO) (each of p, q, and r is 2; X' is O); and 1,5-dithia-3-oxapentane. In certain embodiments, dithiols of Formula (4) include both heteroatom substituents in the carbon backbone and pendent alkyl groups such as methyl. Such compounds include methyl-substituted DMDS, such as HS—CH$_2$CH(CH$_3$)—S—CH$_2$CH$_2$—SH and HS—CH(CH$_3$)CH$_2$—S—CH$_2$CH$_2$—SH, and dimethyl substituted DMDS such as HS—CH$_2$CH(CH$_3$)—S—CH(CH$_3$)CH$_2$—SH and HS—CH(CH$_3$)CH$_2$—S—CH$_2$CH(CH$_3$)—SH.

Two or more different dithiols of Formula (4) may also be employed in preparing thiol-terminated polythioethers of Formula (3) and Formula (3').

Compounds of Formula (5) are divinyl ethers. Divinyl ether itself (m is 0) maybe used. In certain embodiments, divinyl ethers include those compounds having at least one oxyalkanediyl group, and in certain embodiments, 1 to 4 oxyalkanediyl groups (i.e., compounds in which m is an integer from 1 to 4). In certain embodiments of divinyl ethers of Formula (5), m is an integer from 2 to 4. In certain embodiments, divinyl ethers of Formula (5) are commercially available divinyl ether mixtures. Such mixtures are characterized by a non-integral average value for the number of alkoxy units per molecule. Thus, m in Formula (5) may also take on non-integral, rational values between 0 and 10, such as between 1 and 10, between 1 and 4, and in certain embodiments, between 2 and 4.

Examples of suitable divinyl ethers include those compounds in which R$^2$ is C$_{2-6}$ n-alkanediyl or C$_{2-6}$ branched alkanediyl. Examples of divinyl ethers of this type include ethylene glycol divinyl ether (EG-DVE) (R$^2$ is ethanediyl, m is 1); butanediol divinyl ether (BD-DVE) (R$^2$ is butanediyl, m is 1); hexanediol divinyl ether (HD-DVE) (R$^2$ is hexanediyl, m is 1); diethylene glycol divinyl ether (DEG-DVE) (R$^2$ is ethanediyl, m is 2); triethylene glycol divinyl ether (R$^2$ is ethanediyl, m is 3); and tetraethylene glycol divinyl ether (R$^2$ is ethanediyl, m is 4). Useful divinyl ether blends include Pluriol™ type blends such as Pluriol™ E-200 divinyl ether (BASF), for which R$^2$ is ethyl and m is 3.8, as well as DPE polymeric blends such as DPE-2 and DPE-3 (International Specialty Products, Wayne, N.J.). In certain embodiments, a divinyl ether of Formula (5) is selected from DEG-DVE and Pluriol™ E-200.

Suitable divinyl ethers in which R$^2$ is C$_{2-6}$ branched alkanediyl may be prepared by reacting a polyhydroxyl compound with acetylene. Examples of divinyl ethers of this type include compounds in which R$^2$ is an alkyl-substituted methanediyl group such as —CH(CH$_3$)— or an alkyl-substituted ethanediyl such as —CH$_2$CH(CH$_3$)—.

Other suitable divinyl ethers include compounds in which R$^2$ is polytetrahydrofuryl (poly-THF) or polyoxyalkanediyl, for example having an average of about 3 monomer units.

Two or more divinyl ethers of Formula (5) may be used in the foregoing method.

Thus, in certain embodiments, two compounds of Formula (4) and one compound of Formula (5), one compound of Formula (4) and two compounds of Formula (5), two compounds of Formula (4) and of Formula (5), and more than two compounds of one or both formulas, may be used to produce a variety of polythioethers provided by the present disclosure.

The reaction between the compounds of Formula (4) and Formula (5) may be catalyzed by a free radical catalyst. Suitable free radical catalysts include azo compounds such as azobisnitrile compounds such as azo(bis)isobutyronitrile (AIBN); organic peroxides such as benzoyl peroxide and t-butyl peroxide; and similar free-radical generators. The reaction may also be catalyzed by irradiation with ultraviolet light, either with or without a cationic photoinitiating moiety. Ionic catalysis methods, using either inorganic or organic bases, such as triethylamine, may also be employed.

In certain embodiments, an isocyanate-terminated polythioether prepolymer (a) comprises the reaction product of reactants further comprising an alkyl ω-alkenyl ether of Formula (6):

$$CH_2=CH—(CH_2)_s—O—R^{12} \qquad (6)$$

wherein s is an integer from 0 to 10; and R$^{12}$ is selected from C$_{1-6}$ alkyl and substituted C$_{1-6}$ alkyl wherein the one or more substituents is selected from —OH and —NHR wherein R is selected from hydrogen and C$_{1-6}$ alkyl.

Ethers of Formula (6) are alkyl co-alkenyl ethers (ethers having a terminal ethylenically unsaturated group), which can react with terminal thiol groups to cap a polythioether polymer.

For example, capped analogs of thiol-terminated polythioethers of Formula (3) and Formula (3') may be prepared by reacting (n+1) moles of a dithiol of Formula (4) or a mixture of at least two different dithiols of Formula (4), (n) moles of a divinyl ether of Formula (5) or a mixture of at least two different divinyl ethers of Formula (5), and about 0.05 to about 2 moles of a hydroxyl-functional vinyl ether of Formula (6), or a mixture of two different hydroxyl-functional vinyl ethers of Formula (6), in the presence of an appropriate catalyst.

In certain embodiments, an alkyl co-alkenyl ether of Formula (6), is a hydroxyl-functional vinyl ether. In certain embodiments, the hydroxyl-functional vinyl ether is 4-hydroxybutyl vinyl ether.

In certain embodiments of ethers of Formula (6), s is an integer from 0 to 10, an integer from 0 to 6, and in certain embodiments, an integer from 0 to 4. Certain examples of ethers of Formula (6) include monovinyl ethers (s is 0), such as amino- and hydroxyalkyl vinyl ethers, including 3-aminopropyl vinyl ether and 4-hydroxybutyl vinyl ether (butanediol monovinyl ether), as well as unsubstituted alkyl vinyl ethers such as ethyl vinyl ether. In certain embodiments, ethers of Formula (6) include allyl ethers (s is 1), such as 4-aminobutyl allyl ether and 3-hydroxypropyl allyl ether.

Use of 2 mole-equivalents of ethers of Formula (6) affords fully capped polymers, while use of lesser amounts results in partially capped polymers.

In certain embodiments, (n) moles of a dithiol of Formula (4), or a mixture of at least two different dithiols of Formula (4), are reacted with (n+1) moles of a divinyl ether of Formula (5), or a mixture of at least two different divinyl ethers of Formula (5), in the presence of an appropriate catalyst. This method affords an uncapped, vinyl-terminated difunctional polythioethers.

Capped analogs to the foregoing vinyl-terminated polythioethers may be prepared by reacting (n+1) moles of a divinyl ether of Formula (5) or a mixture of at least two different divinyl ethers of Formula (5), (n) moles of a dithiol of Formula (4) or a mixture of at least two different dithiols of Formula (4), and about 0.05 to about 2 moles of a monothiol of Formula (8):

$$HS—R^{12} \qquad (8)$$

wherein R$^{12}$ is selected from C$_{1-6}$ alkyl and substituted C$_{1-6}$ alkyl wherein the one or more substituents is selected from —OH and —NHR wherein R is selected from hydrogen and C$_{1-6}$ alkyl, or a mixture of two different monothiols of Formula (7), in the presence of an appropriate catalyst.

Compounds of Formula (8) are monothiols, which can be unsubstituted or substituted with, for example, hydroxyl or amino groups. Examples of monothiols of Formula (8) include mercaptoalcohols such as 3-mercaptopropanol and mercaptoamines such as 4-mercaptobutylamine.

Polyfunctional analogs of the foregoing difunctional polythioethers may be prepared by combining one or more dithiols of Formula (4) and one or more divinyl ethers of Formula (5), in appropriate amounts, with a polyfunctionalizing agent as described above, and reacting the mixture. In certain embodiments, (n+1) moles a dithiol or a mixture of dithiols of Formula (4), (n) moles of a divinyl ether or mixture of divinyl ethers of Formula (5), and a z-valent polyfunctionalizing agent, are combined to form a reaction mixture. The mixture is then reacted in the presence of a suitable catalyst to afford thiol-terminated polyfunctional polythioethers. Capped analogs of multifunctional polythioethers may be prepared by including in the reaction mixture of about 0.05 to about (z) moles of one or more hydroxyl-functional vinyl ethers of Formula (6). Use of (z) moles affords fully capped polyfunctional polymers, while use of lesser amounts again yields partially capped polymers.

Similarly, (n) moles of a dithiol or combination of dithiols of Formula (4), (n+1) moles of a divinyl ether or combination of divinyl ethers of Formula (5), and a z-valent polyfunctionalizing agent, are combined to form a reaction mixture and reacted as above to afford vinyl-terminated polyfunctional polythioethers. Capped analogs of the foregoing polythioethers are prepared by inclusion in the starting reaction mixture of one or more appropriate monothiols of Formula (8).

In certain embodiments, polythioethers of Formula (3) and Formula (3') may be prepared by combining at least one dithiol of Formula (4) and at least one divinyl ether of Formula (5), optionally together with one or more hydroxyl-functional vinyl ethers of Formula (6) and/or monothiols of Formula (8), and/or a polyfunctionalizing agent, followed by addition of an appropriate catalyst, and carrying out the reaction at a temperature from about 30° C. to about 120° C. for about 2 hours to about 24 hours. In certain embodiments, the reaction is carried out at a temperature from about 70° C. to about 90° C. for about 2 to about 6 hours.

The molecular weight of a thiol-terminated polythioether may vary. In certain embodiments, the number average molecular weight (Mn) of each may be at least 500 grams/mole, or at least 1000 grams/mole, or less than 30,000 grams/mole, or less than 15,000 grams/mole. The number average molecular weight may be determined using known methods. The number average molecular weight values recited herein may be determined by gel permeation chromatography (GPC) using polystyrene standards.

In certain embodiments, thiol-terminated polythioether provided by the present disclosure are liquid at room temperature. In certain embodiments, the thiol-terminated polythioethers have a viscosity, at 100% solids, of no more than about 900 poise, such as from about 10 to about 300 poise, and in certain embodiments from about 100 to about 200 poise, at a temperature of about 25° C. and a pressure of about 760 mm Hg determined according to ASTM D-2849 §79-90 using a Brookfield CAP 2000 viscometer.

Isocyanate-terminated polyformal prepolymers provided by the present disclosure may be prepared by reacting a diisocyanate having a first isocyanate group and a second isocyanate group, wherein the reactivity of the first isocyanate group with a thiol group is greater than the reactivity of the second isocyanate group with the thiol group; and a thiol-terminated polyformal.

In certain embodiments, a thiol-terminated polyformal is selected from a difunctional thiol-terminated polyformal, a multifunctional thiol-terminated polyformal, and a combination thereof.

In certain embodiments, a thiol-terminated polyformal is selected from a thiol-terminated polyformal of Formula (9), a thiol-terminated polyformal Formula (9'), or a combination thereof:

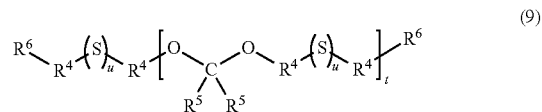

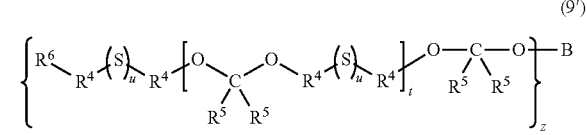

wherein:
t is an integer selected from 1 to 50;
each u is independently selected from 1 and 2;
each $R^4$ is independently selected from $C_{2-6}$ alkanediyl;
each $R^5$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and
each $R^6$ is a group comprising a terminal thiol group; and
B represents a core of a z-valent polyol $B(OH)_z$ wherein z is an integer from 3 to 6.

In certain embodiments of a compound of Formula (9) and Formula (9'), each $R^6$ is independently a thiol-terminated group selected from a group of Formula (a), Formula (b), Formula (c), Formula (d), Formula (e), Formula (f), Formula (g), and Formula (h):

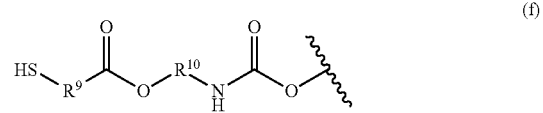

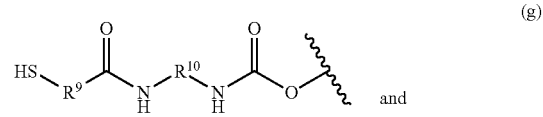

-continued

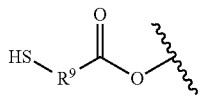
(h)

wherein:
each $R^8$ is selected from a moiety derived from a diisocyanate and a moiety derived from an ethylenically unsaturated monoisocyanate;
each $R^9$ is independently selected from $C_{2-14}$ alkanediyl and $C_{2-14}$ heteroalkanediyl; and
each $R^{10}$ is independently selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, and substituted $C_{4-18}$ alkanecycloalkanediyl.

In certain embodiments of Formula (a), each $R^8$ is a moiety derived from a diisocyanate, and in certain embodiments the group is derived from TDI, ISONATE™ 143L (polycarbodiimide-modified diphenylmethane diisocyanate), DESMODUR® N3400 (1,3-diazetidine-2,4-dione, 1,3-bis(6-isocyanatohexyl)-), DESMODUR® I (isophorone diisocyanate, IPDI), or DESMODUR® W ($H_{12}$MDI).

In certain embodiments of Formula (a), each $R^8$ is a group derived from an ethylenically unsaturated monoisocyanate, and in certain embodiments is 2-isocyanatoethyl methacrylate.

In certain embodiments of Formula (a), Formula (b), Formula (c), Formula (e), Formula (f), Formula (g), and Formula (h), each $R^9$ is selected from $C_{2-6}$ alkanediyl. In certain embodiments of Formula (a), Formula (b), Formula (d), Formula (e), Formula (f), Formula (g), and Formula (h), each $R^9$ is selected from —$CH_2$—S—($CH_2$)$_2$—O—($CH_2$)$_2$—O—($CH_2$)$_2$—, —($CH_2$)$_2$—O—($CH_2$)$_2$—O—($CH_2$)$_2$—, and —($CH_2$)$_2$—S—($CH_2$)$_2$—O—($CH_2$)$_2$—O—($CH_2$)$_2$—.

In certain embodiments of Formula (f) and Formula (g), each $R^{10}$ is independently selected from $C_{2-6}$ alkanediyl, $C_{6-12}$ arenediyl, substituted $C_{6-12}$ arenediyl, $C_{3-12}$ cycloalkanediyl, substituted $C_{3-12}$ cycloalkanediyl, $C_{7-18}$ alkanearenediyl, substituted $C_{7-18}$ alkanearenediyl, $C_{4-18}$ alkanecycloalkanediyl, and substituted $C_{4-18}$ alkanecycloalkanediyl.

In certain embodiments, a thiol-terminated polyformal polymer comprises the reaction products of reactants comprising (a) and (b), where (a) comprises the reaction products of reactants comprising (i) and (ii), where (i) comprises a sulfur-containing polyol selected from a difunctional polyol of Formula (10), a multifunctional polyol of Formula (10'), and a combination thereof:

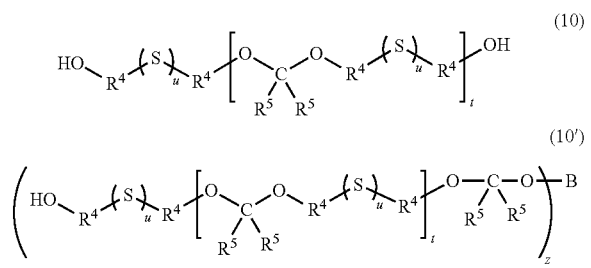

where each t is independently an integer selected from 1 to 50; z is an integer selected from 3 to 6; each u is independently selected from 1 and 2; each $R^4$ is independently selected from $C_{2-6}$ alkanediyl; each $R^5$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl; and B represents the core of an m-valent parent polyol B(OH)$_z$; and (ii) comprises a first compound selected from a diisocyanate, thiourea, an ethylenically unsaturated monoisocyanate, and a tosylate; and (b) comprises a mercaptoalkanol when (ii) comprises a diisocyanate; a metal hydrosulfide when (ii) comprises thiourea; a dithiol when (ii) comprises an ethylenically unsaturated monoisocyanate; and a metal hydrosulfide when (ii) comprises a tosylate.

In certain embodiments, the first compound is a diisocyanate including any of those described herein.

In certain embodiments, the first compound is an ethylenically unsaturated monoisocyanate including any of those described herein.

In certain embodiments, the first compound is tosylate including any of those described herein such as p-toluenesulfonyl chloride.

In certain embodiments, the second compound is a mercaptoalkanol such as, for example, $C_{2-6}$ mercaptoalkanols such as 2-mercaptoethan-1-ol, 3-mercaptopropan-1-ol, 4-mercaptobutan-1-ol, 5-mercaptopentan-1-ol, and 6-mercaptohexan-1-ol. Examples of suitable dithiols include, for example, $C_{2-10}$ alkanedithiols such as ethane-1,2-dithiol, propane-1,3-dithiol, butane-1,4-dithiol, pentane-1,5-dithiol, and hexane-1,6-dithiol.

In certain embodiments, the second compound is a metal hydrosulfide such as sodium hydrosulfide.

In certain embodiments, the second compound is a dithiol including, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol, dimercaptodiethylsulfide, methyl-substituted dimercaptodiethylsulfide, dimethyl-substituted dimercaptodiethylsulfide, dimethyl-substituted dimercaptodiethylsulfide, dimercaptodioxaoctane, and 1,5-dimercapto-3-oxapentane. A dithiol may have one or more pendant groups selected from $C_{1-4}$ alkyl, $C_{1-4}$ alkoxy, and hydroxyl.

In certain embodiments a dithiol is an alkyl(bis)oxydialkane thiol. Alkyl(bis)oxydialkane thiols may have the general formula HS—R—O—R—O—R—HS, where each R is an alkanediyl such as, for example, $C_{2-6}$ alkanediyl, $C_{2-4}$ alkanediyl, or ethane-1,2-diyl. Suitable dithiols include alkyl (bis)oxyalkanedithiols such as 1,8-dimercapto-3,6-dioxaoctane (DMDO) or dimercaptodiethylsulfide (DMDS). In certain embodiments, a dithiol is selected from dimercaptodiethylsulfide (DMDS), dimercaptodioxaoctane (DMDO), and 1,5-dimercapto-3-oxapentane.

Other examples of suitable dithiols include compounds of the formula HS—R—SH where R is a $C_{2-6}$ alkanediyl, having one or more pendant groups, which can be, for example, hydroxyl groups, $C_{1-6}$ alkyl groups such as methyl or ethyl groups; $C_{1-6}$ alkoxy, $C_{6-8}$ cycloalkanediyl, $C_{6-10}$ alkanecycloalkanediyl, —[—($CH_2$)$_s$—X'—]$_q$—($CH_2$)$_r$—, or —[—($CH_2$)$_s$—X'—]$_q$—($CH_2$)$_r$— in which at least one —$CH_2$— unit is substituted with a methyl group and in which each s is independently selected from an integer selected from 2 to 6, each q is independently selected from an integer selected from 1 to 5, and each r is independently selected from an integer selected from 2 to 10. Dithiols may include one or more heteroatom substituents in the carbon backbone, for example, dithiols in which X' is a heteroatom such as O, S or other bivalent heteroatom radical, a secondary or tertiary amine group such as —NR—, where R is hydrogen or methyl, or another substituted trivalent heteroatom. In certain embodiments, X' is —O—, —S—, and in certain embodiments, p and r are equal, and in certain embodiments both p and r are 2. In certain embodiments, X' is a bond. Other examples of suitable dithiols are disclosed, for example, in U.S. Pat. No. 6,172,179.

In certain embodiments of the above thiol-terminated polyformals have a number average molecular weight from 200 to 6,000 Daltons, from 500 to 5,000 Daltons, from 1,000 to 5,000 Daltons, from 1,500 to 4,000 Daltons, and in certain embodiments, from 2,000 to 3,600 Daltons.

Thiol-terminated polyformals of Formula (9) or Formula (9') may be prepared by reacting an ethylenically unsaturated monoisocyanate with a polyol of Formula (10) or Formula (10') such as the 2-isocyanatoethyl methacrylate adduct or the allyl isocyanate adduct with a dithiol such as DMDO. Thiol-terminated polyformals of Formula (9) or Formula (9') may also be prepared by reacting a tosyl-ester of a sulfur-containing polymer of Formula (10) or Formula (10') with NaSH in the presence of MeN(Bu)$_3^+$Cl$^-$ in water to provide the corresponding thiol-terminated polyformals of Formula (9) or Formula (9'). Alternatively, a tosyl-ester of a polyol of Formula (10) or Formula (10') may be reacted with thiourea in the presence of MeN(Bu)$_3^+$Cl$^-$ in water to provide the tosylate salt of the thiourea adduct, which may then be reacted in the presence of base at elevated temperature to provide the corresponding thiol-terminated polyformals of Formula (9) or Formula (9'). Alternatively, to obtain thiol-terminated polyformals of Formula (9) or Formula (9'), a polyol of Formula (10) or Formula (10') may first be reacted with a diisocyanate such as TDI in the presence of dibutyltin dilaurate at 75° C. to 80° C. to provide the corresponding isocyanate-terminated polythioether. The isocyanate-terminated polythioether may then be reacted with a mercaptoalkanol such as 2-mercaptoethanol or 3-mercaptopropanol to provide the corresponding thiol-terminated polyformals of Formula (9) or Formula (9').

In certain embodiments, a thiol-terminated polyformal may be or may be based on an isocyanate-terminated sulfur-containing prepolymer as disclosed in U.S. patent application Ser. Nos. 13/050,988 and 13/051,002 and U.S. Provisional Application No. 61/453,978, filed on Mar. 18, 2011.

In certain embodiments, a polyformal polyol of Formula (10) and (10') is selected from:
(i) the reaction products of reactants comprising a sulfur-containing diol; and a reactant selected from an aldehyde, a ketone, and a combination thereof;
(ii) the reaction products of reactants comprising a sulfur-containing diol; a polyol containing at least three hydroxyl groups per polyol molecule; and a reactant selected from an aldehyde, a ketone, and a combination thereof; and
(iii) a combination of (i) and (ii).

In certain embodiments, the polyformal polyol comprises a polyformal polyol of Formula (10), a polyformal polyol of Formula (10'), or a combination thereof, wherein each $R^4$ is ethane-1,2-diyl and each $R^5$ is hydrogen.

In certain embodiments of polyformal polymers of Formula (9), Formula (9'), Formula (10), and Formula (10'), each $R^4$ is independently selected from $C_{2-6}$ alkanediyl, $C_{2-4}$ alkanediyl, $C_{2-3}$ alkanediyl, and in certain embodiments, ethane-1,2-diyl. In certain embodiments of polyformal polymers of Formula (9), Formula (9'), Formula (10), and Formula (10'), each $R^4$ is ethane-1,2-diyl.

In certain embodiments of sulfur-containing polymers of Formula (9), Formula (9'), Formula (10), and Formula (10'), each $R^5$ is independently selected from hydrogen, $C_{1-6}$ alkyl, $C_{1-4}$ alkyl, $C_{1-3}$ alkyl, and in certain embodiments, $C_{1-2}$ alkyl. In certain embodiments of sulfur-containing polymers of Formula (9), Formula (9'), Formula (10), and Formula (10'), each $R^5$ is methyl, and in certain embodiments, ethyl. In certain embodiments of sulfur-containing polymers of Formula (9), Formula (9'), Formula (10), and Formula (10'), each $R^5$ is hydrogen, and in certain embodiments, each $R^5$ is selected from hydrogen, methyl, and ethyl.

In certain embodiments of sulfur-containing polymers of Formula (9), Formula (9'), Formula (10), and Formula (10'), each $R^4$ is the same and is selected from a $C_{2-3}$ alkanediyl such as ethane-1,2-diyl and propane-1,3-diyl; and each $R^5$ is the same and is selected from hydrogen and $C_{1-3}$ alkyl such as methyl, ethyl, and propyl. In certain embodiments of sulfur-containing polymers of Formula (9), Formula (9'), Formula (10), and Formula (10'), each $R^5$ is hydrogen, and in certain embodiments, each $R^5$ is methyl. In certain embodiments of sulfur-containing polymers of Formula (9), Formula (9'), Formula (10), and Formula (10'), each $R^4$ is ethane-1,2-diyl and each $R^5$ is hydrogen. In certain embodiments of sulfur-containing polymers of Formula (9), Formula (9'), Formula (10), and Formula (10'), each $R^4$ is the same and is selected from ethane-1,2-diyl and propane-1,3-diyl; and each $R^5$ is independently selected from hydrogen, methyl, and ethyl.

In certain embodiments of sulfur-containing polymers of Formula (9), Formula (9'), Formula (10), and Formula (10'), t is an integer selected from 1 to 50, an integer selected from 2 to 40, an integer selected from 4 to 30, and in certain embodiments, t is an integer selected from 7 to 30.

In certain embodiments of sulfur-containing polymers of Formula (9), Formula (9'), Formula (10), and Formula (10'), each u is the same and is 1, and in certain embodiments, each u is the same and is 2.

In certain embodiments of a sulfur-containing polyols of Formula (9') and Formula (10'), where z is 3, the parent polyol B(OH)$_z$ is a triol of Formula (11):

(11)

where each $R^{13}$ is independently $C_{1-6}$ alkanediyl, and in certain embodiments, a triol of Formula (12):

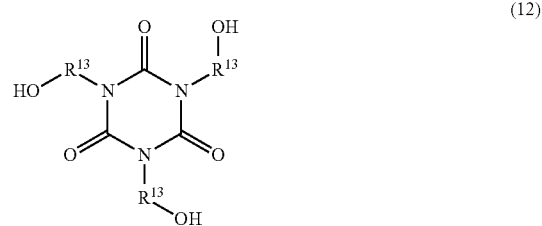

(12)

where each $R^{13}$ is independently $C_{1-6}$ alkanediyl. Accordingly, in these embodiments B has the structure:

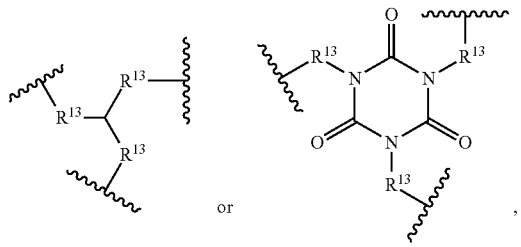

or respectively, where each $R^{13}$ is independently $C_{1-6}$ alkanediyl. In certain embodiments of polyols of Formula (11) and Formula (12), each $R^{13}$ is the same and is $C_{1-6}$ alkanediyl, $C_{1-4}$ alkanediyl, and in certain embodiments, $C_{1-2}$ alkanediyl.

In certain embodiments, a sulfur-containing diol of Formula (10) comprises the reaction products of a sulfur-containing diol; and a reactant selected from an aldehyde, a ketone, and a combination thereof. In certain embodiments of the reaction, the sulfur-containing diol comprises a diol of Formula (13):

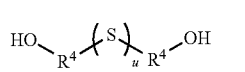 (13)

where u is selected from 1 and 2; and each $R^4$ is independently selected from $C_{2-6}$ alkanediyl. In certain embodiments of a sulfur-containing diol, u is 1 and in certain embodiments u is 2. In certain embodiments of a sulfur-containing diol, each $R^4$ is the same and in certain embodiments, each $R^4$ is different. In certain embodiments, each $R^4$ is selected from $C_{2-5}$ alkanediyl, $C_{2-4}$ alkanediyl, $C_{2-3}$ alkanediyl, and in certain embodiments, each $R^4$ is ethane-1,2-diyl. In certain embodiments of the reaction, the sulfur-containing diol comprises a sulfur-containing diol selected from 2,2'-thiodiethanol, 3,3'-thiobis(propan-1-ol), 4,4'-thiobis(butan-1-ol), and a combination of any of the foregoing. In certain embodiments of the reaction, the sulfur-containing diol comprises 2,2'-thiodiethanol.

In certain embodiments of the reaction, the sulfur-containing diol comprises a single type of sulfur-containing diol, and in certain embodiments, comprises a mixture of sulfur-containing diols. A mixture of sulfur-containing diols may comprise from 5 mol % to 95 mol % of one or more thioethers (u is 1) and from 95 mol % to 5 mol % of one or more disulfides (u is 2). In certain embodiments, a mixture of sulfur-containing diols comprises 50 mol % of one or more thioethers and 50 mol % of one or more disulfides. In certain embodiments, a mixture of sulfur-containing diols comprises from 0 mol % to 30 mol % of one or more disulfides, and from 100 mol % to 70 mol % of one or more thioethers.

In certain embodiments of the reaction, a reactant is an aldehyde. In certain embodiments in which a reactant is an aldehyde, the aldehyde comprises a $C_{1-6}$ aldehyde, a $C_{1-4}$ aldehyde, a $C_{1-3}$ aldehyde, and in certain embodiments, a $C_{1-2}$ aldehyde. In certain embodiments, the aldehyde is formaldehyde. In certain embodiments in which a reactant is formaldehyde, the formaldehyde is provided as paraformaldehyde.

In certain embodiments of the reaction, a reactant is a ketone. In certain embodiments in which a reactant is a ketone, the ketone has the formula $C(O)R_2$ where each R is independently selected from $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl. In certain embodiments of a ketone, each R is independently selected from methyl, ethyl, and propyl. In certain embodiments, a ketone is selected from propan-2-one, butan-2-one, pentan-2-one, and pentan-3-one.

In certain embodiments, a sulfur-containing diol of Formula (10) comprises the reaction products of reactants comprising 2,2'-thiodiethanol and formaldehyde, and is referred to herein as thiodiglycol polythioether or thiodiglycol polyformal.

The reaction used to prepare a sulfur-containing diol of Formula (10) may take place in the presence of an acidic catalyst, such as sulfuric acid, sulfonic acid, or a combination thereof. In certain embodiments, a sulfonic acid may be used. Examples of sulfonic acids include alkyl sulfonic acids such as methane sulfonic acid, ethane sulfonic acid tert-butane sulfonic acid, 2-propane sulfonic acid, and cyclohexyl sulfonic acid; alkene sulfonic acids such as α-olefin sulfonic acid, dimerized α-olefin sulfonic acid, and 2-hexene sulfonic acid; aromatic sulfonic acids such as para-toluene sulfonic acids, benzene sulfonic acid, and naphthalene sulfonic acid; and polymer-supported sulfonic acids such as Amberlyst™ sulfonic acid catalysts available from Dow Chemical.

In certain embodiments, sulfur-containing diols of Formula (10) have a hydroxyl number from 10 to 100, from 20 to 80, from 20 to 60, from 20 to 50, and in certain embodiments, from 20 to 40. The hydroxyl number is the hydroxyl content of the sulfur-containing diol, and may be determined, for example, by acetylating the hydroxyl groups and titrating the resultant acid against potassium hydroxide. The hydroxyl number is the weight of potassium hydroxide in milligrams that will neutralize the acid from one gram of the sulfur-containing polymer.

In certain embodiments, a sulfur-containing polymer of Formula (10) has a number average molecular weight from 200 to 6,000 Daltons, from 500 to 5,000 Daltons, from 1,000 to 5,000 Daltons, from 1,500 to 4,000 Daltons, and in certain embodiments, from 2,000 to 3,600 Daltons.

In certain embodiments, sulfur-containing polyols of Formula (10') contains at least three hydroxyl groups per polyol molecule. For example, a polyol may contain from three to ten hydroxyl groups per polyol molecule, from three to eight hydroxyl groups per polyol molecule, from three to six hydroxyl groups per polyol molecule, and in certain embodiments, from three to four hydroxyl groups per polyol molecule. In certain embodiments, a polyol of Formula (10') contains four hydroxyl groups per polyol molecule, and in certain embodiments, a polyol of Formula (10') contains three hydroxyl groups per polyol molecule. The polyol may be a single type of polyol or may be a mixture of different polyols having the same or different number of hydroxyl groups per molecule.

In certain embodiments, polyols comprise the reaction products of reactants comprising a sulfur-containing diol; a polyol containing at least three hydroxyl groups per polyol molecule; and a reactant selected from an aldehyde, a ketone, and a combination thereof. The reactants may comprise one or more types of sulfur-containing diol, one or more types of polyol, and/or one or more types of aldehyde and/or ketone.

In certain embodiments, the sulfur-containing diol comprises a diol of Formula (10) where each $R^3$ is independently selected from $C_{2-6}$ alkanediyl. In certain embodiments, the sulfur-containing diol comprises a sulfur-containing diol selected from 2,2'-thiodiethanol, 3,3'-thiobis(propan-1-ol), 4,4'-thiobis(butan-1-ol), and a combination of any of the foregoing. In certain embodiments of the reaction, the sulfur-containing diol comprises 2,2'-thiodiethanol.

In certain embodiments, the sulfur-containing diol comprises a single type of sulfur-containing diol, and in certain embodiments, comprises a combination of sulfur-containing diols.

In certain embodiments, a polyol contains at least three hydroxyl groups per polyol molecule. For example, a polyol may contain from three to ten hydroxyl groups per polyol molecule, from three to eight hydroxyl groups per polyol molecule, from three to six hydroxyl groups per polyol molecule, and in certain embodiments, from three to four hydroxyl groups per polyol molecule. In certain embodiments, a polyol contains four hydroxyl groups per polyol molecule, and in certain embodiments, a polyol contains three hydroxyl groups per polyol molecule. The polyol may be a single type of polyol or may be a combination of different polyols having the same or different number of hydroxyl groups per molecule.

In certain embodiments, a polyol has the formula $B(OH)_z$, where z is an integer from 3 to 6, and B represents the core of the z-valent polyol. In certain embodiments, a polyol comprises a triol (z is 3) of Formula (11):

(11)

where each $R^{13}$ is independently $C_{1-6}$ alkanediyl, and in certain embodiments, a triol of Formula (12):

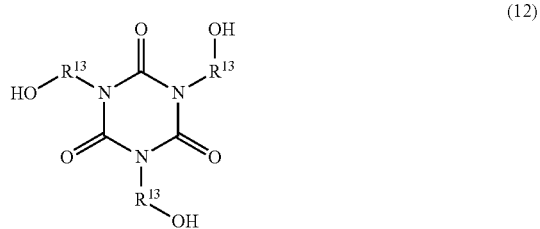

(12)

where each $R^{13}$ is independently $C_{1-6}$ alkanediyl. In certain embodiments of a polyol of Formula (11) and Formula (12), each $R^{13}$ may be independently selected from $C_{1-4}$ alkanediyl, and in certain embodiments, from $C_{1-3}$ alkanediyl. In certain embodiments of a polylol of Formula (11) and Formula (12), each $R^{13}$ may be the same, and in certain embodiments, each $R^{13}$ may be different. In certain embodiments of a polyol of Formula (11) and Formula (12), each $R^{13}$ is selected from methanediyl, ethane-1,2-diyl, propane-1,3-diyl, and in certain embodiments, butane-1,4-diyl.

In certain embodiments of a reaction comprising polyols of Formula (10) and Formula (10'), the reactant is an aldehyde. In certain embodiments in which the reactant is an aldehyde, the aldehyde comprises a $C_{1-6}$ aldehyde, a $C_{1-4}$ aldehyde, a $C_{1-3}$ aldehyde, and in certain embodiments, a $C_{1-2}$ aldehyde. In certain embodiments, the aldehyde comprises an alkyl and is selected from acetaldehyde, propionaldehyde, isobutyraldehyde, and butyraldehyde. In certain embodiments, the aldehyde is formaldehyde. In certain embodiments in which the reactant is formaldehyde, the formaldehyde is provided as paraformaldehyde.

In certain embodiments of a reaction comprising polyols of Formula (10) and Formula (10'), the reactant is a ketone. In certain embodiments in which the reactant is a ketone, the ketone has the formula $C(O)R_2$ where each R is independently selected from $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl. In certain embodiments of a ketone, each R is independently selected from methyl, ethyl, and propyl. In certain embodiments, a ketone is selected from propan-2-one, butan-2-one, pentan-2-one, pentan-3-one, and 3-methylbutan-2-one.

In certain embodiments of a reaction comprising polyols of Formula (10) and Formula (10'), a polyol comprises the reaction product of reactants comprising 2,2'-thiodiethanol, a polyol, and formaldehyde. In certain embodiments, a polyformal polyol comprises the reaction product of reactants comprising 2,2'-thiodiethanol, a triol, and formaldehyde. In certain embodiments, a polyformal polyol provided by the present disclosure comprises the reaction product of reactants comprising 2,2'-thiodiethanol, formaldehyde, and a triol of Formula (11). In certain embodiments, a polyformal polyol provided by the present disclosure comprises the reaction product of reactants comprising 2,2'-thiodiethanol, formaldehyde, and a triol of Formula (12).

In embodiments in which the one or more polyols used to form polyformal polyols provided by the present disclosure have the same number of hydroxyl groups, the polyformal polyol will have a hydroxyl functionality approximately equivalent to that of the one or more polyols. For example, when a polyol having a hydroxyl functionality of three or a combination of polyols in which each of the polyols in the combination has a hydroxyl functionality of three is used to prepare a polyformal polyol, the polyformal polyol will have a hydroxyl functionality of three. In certain embodiments, a polyformal polyol may have an average hydroxyl functionality of three, four, five, and in certain embodiments, six.

When polyols having different hydroxyl functionalities are used to prepare polyformal polyols, the polyformal polyols can exhibit a range of functionalities. For example, polyformal polyols provided by the present disclosure may have an average hydroxyl functionality from 3 to 12, from 3 to 9, from 3 to 6, from 3 to 4, and in certain embodiments, from 3.1 to 3.5. In certain embodiments, a polyformal polyol having an average hydroxyl functionality from three to four may be prepared by reacting a combination of one or more polyols having a hydroxyl functionality of three and one or more polyols having a hydroxyl functionality of four.

In certain embodiments, polyformal polyols provided by the present disclosure have a hydroxyl number from 10 to 100, from 20 to 80, from 20 to 60, from 20 to 50, and in certain embodiments, from 20 to 40. The hydroxyl number is the hydroxyl content of the polyformal polyol, and may be determined, for example, by acetylating the hydroxyl groups and titrating the resultant acid against potassium hydroxide. The hydroxyl number is the weight of potassium hydroxide in milligrams that will neutralize the acid from one gram of the polyformal polyol.

In certain embodiments, polyformal polyols provided by the present disclosure have a number average molecular weight from 200 to 6,000 Daltons, from 500 to 5,000 Daltons, from 1,000 to 4,000 Daltons, from 1,500 to 3,500 Daltons, and in certain embodiments, from 2,000 Daltons to 3,000 Daltons.

In certain embodiments, thiol-terminated polyformals provided by the present disclosure are liquid at room temperature. Moreover, in certain embodiments, the thiol-terminated polyformals have a viscosity, at 100% solids, of no more than 500 poise, such as 10 to 300 poise or, in some cases, 100 to 200 poise, at a temperature of 25° C. and a pressure of 760 mm Hg determined according to ASTM D-2849 §79-90 using a Brookfield CAP 2000 viscometer. In certain embodiments, the Tg (glass transition temperature) of sulfur-containing polymer provided by the present disclosure is not higher than −40° C., and in certain embodiments, is not higher than −50° C.

In certain embodiments a polyamine is selected from an aromatic polyamine, an aromatic amine-terminated polythioethers, and a combination thereof. In certain embodiments, a polyamine comprises one or more aromatic polyamines. In certain embodiments, a polyamine comprises one or more aromatic amine-terminated polythioethers. In certain embodiments, a polyamine comprises one or more aromatic polyamines and one or more aromatic amine-terminated polythioethers.

In certain embodiments, a polyamine comprises an aromatic polyamine. In certain embodiments, an aromatic amine is selected from dimethylthiotoluene diamine, diethylthiotoluene diamine, and combinations thereof. In certain embodiments, an aromatic amine is dimethylthiotoluene diamine, in certain embodiments, diethylthiotoluene diamine, and in certain embodiments, a combination of dimethylthiotoluene diamine and diethylthiotoluene diamine.

In certain embodiments, an aromatic polyamine is selected from m-xylenediamine, xylylene diamine, xylylenediamine trimer, metaphenylene diamine, diaminodiphenylmethane, diaminodiphenylsulfone, diethyltoluene diamine, diethylthiotoluene diamine, and a combination of any of the foregoing. In certain embodiments, an aromatic polyamine is selected from diethyltoluene diamine, dimethylthiotoluene diamine, and a combination thereof. In certain embodiments, an aromatic diamine comprises dimethylthiotoluenediamine such as Ethacure® 300, which comprises 95%-97% dimethylthiotoluene diamine, 2%-3% monomethylthiotoluene diamine, where the dimethylthiotoluene diamine comprises a combination of the 3,5-dimethylthio-2,6-toluene diamine, and 3,5-dimethylthio-2,4-toluene diamine as the major isomer. In certain embodiments, an aromatic diamine comprises diethylthiotoluenediamine such as Ethacure® 100, which comprises 75%-81% diethyltoluene-2,4-diamine and 18%-20% 3,5-diethyltoluene-2,6-diamine. In certain embodiments, the composition comprises a molar equivalent excess of isocyanate to amine, such as, for example, a molar equivalent excess from 1.01 to 1.2, from 1.02 to 1.1, from 1.02 to 1.08, from 1.03 to 1.07, and in certain embodiments, 1.05.

In certain embodiments, a polyamine comprises one or more amine-terminated polythioethers and any of the foregoing aromatic amines.

In certain embodiments, a polyamine comprises an aromatic amine-terminated polythioether. In certain embodiments, an aromatic amine-terminated polythioether is selected from a polythioether of Formula (14), a polythioether of Formula (14'), and a combination thereof:

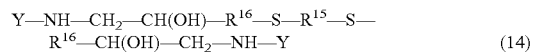

Y—NH—CH$_2$—CH(OH)—R$^{16}$—S—R$^{15}$—S—R$^{16}$—CH(OH)—CH$_2$—NH—Y     (14)

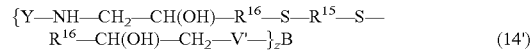

{Y—NH—CH$_2$—CH(OH)—R$^{16}$—S—R$^{15}$—S—R$^{16}$—CH(OH)—CH$_2$—V'—}$_z$B     (14')

wherein:

each $R^{15}$ is independently selected from $C_{2-10}$ alkanediyl, $C_{2-10}$ oxyalkanediyl, $C_{6-8}$ cycloalkanediyl, $C_{6-10}$ alkylcycloalkanediyl, and —[—(CHR$^3$)$_s$—X'—]$_q$—(CHR$^3$)$_r$—; wherein each $R^3$ is independently selected from hydrogen and methyl;

each X' is independently selected from —O—, —S—, and —NR— wherein R is selected from hydrogen and methyl;

s is an integer from 2 to 6;

q is an integer from 1 to 5; and r is an integer from 2 to 10;

each $R^{16}$ is independently selected from $C_{3-20}$ alkanediyl and $C_{3-20}$ oxyalkanediyl; B represents the core of a z-valent polyfunctionalizing agent B(V)$_z$, wherein:

z is an integer from 3 to 6; and each V comprises a group that is reactive with an epoxy group; each —CH(OH)—CH$_2$—V'— comprises a moiety resulting from the reaction of V with an epoxy group; and each Y—NH— is derived from an aromatic polyamine.

In certain embodiments of aromatic amine-terminated polythioethers of Formula (14) and Formula (14'), each —R$^{16}$—S—R$^{15}$—S—R$^{16}$— independently has the structure of Formula (15):

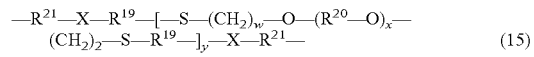

—R$^{21}$—X—R$^{19}$—[—S—(CH$_2$)$_w$—O—(R$^{20}$—O)$_x$—(CH$_2$)$_2$—S—R$^{19}$—]$_y$—X—R$^{21}$—     (15)

wherein:

each $R^{19}$ is independently selected from $C_2$-10 alkanediyl, $C_{2-10}$ oxyalkanediyl, $C_{6-8}$ cycloalkanediyl, $C_{6-10}$ alkylcycloalkanediyl, $C_{5-8}$ heterocycloalkanediyl, and —[—(CHR$^3$)$_s$—X'—]$_q$—(CHR$^3$)$_r$—; wherein each $R^3$ is independently selected from hydrogen and methyl;

each X' is independently selected from O, S, and —NR— wherein R is selected from hydrogen and methyl;

s is an integer from 2 to 6;

q is an integer from 1 to 5; and r is an integer from 2 to 10;

each w is independently an integer from 2 to 6;

each x is independently an integer from 0 to 50;

y is an integer from 1 to 60;

each X is independently selected from —O—, —S—, and —NR— wherein R is selected from hydrogen and methyl;

each $R^{20}$ is independently selected from $C_{3-20}$ alkanediyl and $C_{3-20}$ oxyalkanediyl; and each $R^{21}$ is independently selected from $C_{3-20}$ alkanediyl and $C_{3-20}$ oxyalkanediyl.

In certain embodiments of aromatic amine-terminated polythioethers of Formula (14) and Formula (14'), each —R$^{16}$—S—R$^{15}$—S—R$^{16}$— has the structure of Formula (16):

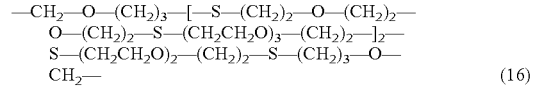

—CH$_2$—O—(CH$_2$)$_3$—[—S—(CH$_2$)$_2$—O—(CH$_2$)$_2$—O—(CH$_2$)$_2$—S—(CH$_2$CH$_2$O)$_3$—(CH$_2$)$_2$—]$_2$—S—(CH$_2$CH$_2$O)$_2$—(CH$_2$)$_2$—S—(CH$_2$)$_3$—O—CH$_2$—     (16)

In certain embodiments, an amine-terminated polythioether comprises the reaction products of reactants comprising:

(a) an epoxy-terminated polythioether selected from an epoxy-terminated polythioether of Formula (17), an epoxy-terminated polythioether of Formula (17'), and a combination thereof:

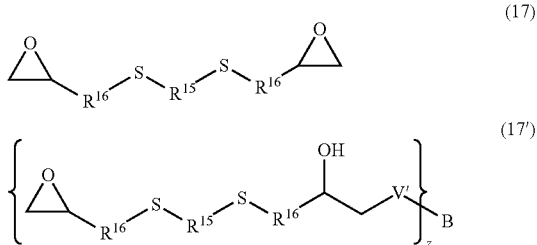

wherein:
each $R^{15}$ is independently selected from $C_{2-10}$ alkanediyl, $C_{2-10}$ oxyalkanediyl, $C_{6-8}$ cycloalkanediyl, $C_{6-10}$ alkylcycloalkanediyl, and $-[-(CHR^3)_s-X'-]_q-(CHR^3)_r-$; wherein
  each $R^3$ is independently selected from hydrogen and methyl;
  each X' is independently selected from O, S, and —NR— wherein R is selected from hydrogen and methyl;
  s is an integer from 2 to 6;
  q is an integer from 1 to 5; and
  r is an integer from 2 to 10;
each $R^{16}$ is independently selected from $C_{3-20}$ alkanediyl and $C_{3-20}$ oxyalkanediyl;
B represents the core of a z-valent polyfunctionalizing agent $B(V)_z$, wherein:
  z is an integer from 3 to 6; and
  V is a group comprising a terminal group that is reactive with an epoxy group; and
—CH(OH)—CH$_2$—V'— comprises a moiety resulting from the reaction of V with an epoxy group; and (b) an aromatic polyamine.

In certain embodiments of the above reaction, the polyamine comprises an aromatic polyamine including any of the aromatic polyamines disclosed herein. Accordingly, in certain embodiments, an amine-terminated polythioether comprises an aromatic amine-terminated polythioether.

In certain embodiments, an amine-terminated polythioether comprises an adduct of Formula (18):

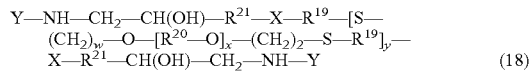

wherein:
each $R^{19}$ is independently selected from $C_{2-10}$ alkanediyl, substituted $C_{2-10}$ alkanediyl wherein each substituent group is independently selected from $C_{1-3}$ alkyl, $C_{1-3}$ alkoxy, $C_{6-8}$ cycloalkyl, $C_{6-10}$ alkylcycloalkyl, and $C_{5-8}$ heteroalkyl, and $-[(CHR^3-)_s-X'-]_q-(CHR^3-)_r-$, wherein:
  s is an integer from 2 to 6;
  q is an integer from 1 to 5;
  r is an integer from 2 to 10;
  each $R^3$ is independently selected from hydrogen and methyl; and each X' is independently selected from O, S, and —NHR—, wherein R is selected from hydrogen and methyl;
each $R^{20}$ is independently selected from $C_{3-20}$ alkanediyl and $C_{3-20}$ oxyalkanediyl;

each $R^{21}$ is independently a divalent linking group;
each w is independently an integer from 2 to 6;
each x is independently an integer from 0 to 50;
each y is independently an integer from 1 to 60;
each X is independently selected from —O—, —S—, and —NR— wherein R is selected from hydrogen and methyl; and
Y—NH— is derived from an aromatic polyamine.

Amine-terminated polythioethers include any of those disclosed in U.S. Pat. Nos. 7,879,955 and 7,622,548.

In certain embodiments, an amine-terminated polythioether comprises Permapol® L5534 (PRC-DeSoto International).

Compositions provided by the present disclosure may comprise one or more different types of filler. Suitable fillers include those commonly known in the art, including inorganic fillers, such as carbon black and calcium carbonate (CaCO$_3$), and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition.

As can be appreciated, polyisocyanate prepolymers, polyamines, and fillers employed in a composition, as well as any additives, may be selected so as to be compatible with each other.

Compositions provided by the present disclosure may include one or more colorants, thixotropic agents, accelerators, retardants, adhesion promoters, solvents, masking agents, or a combination of any of the foregoing.

As used herein, the term "colorant" means any substance that imparts color and/or other opacity and/or other visual effect to the composition. A colorant may be of any suitable form, such as discrete particles, dispersions, solutions, and/or flakes. A single colorant or a combination of two or more colorants may be used in a composition.

Examples of colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant may be organic or inorganic and may be agglomerated or non-agglomerated. Colorants may be incorporated into a composition by use of a grind vehicle, such as an acrylic grind vehicle. Examples of pigments and/or pigment compositions include carbazole dioxazine crude pigment, azo, monoazo, diazo, naphthol AS, salt type (flakes), benzimidazolone, isoindolinone, isoindoline, polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red (DPPBO red), titanium dioxide, carbon black, and combinations of any of the foregoing. Examples of dyes include those that are solvent- and/or aqueous-based such as phthalo green or blue, iron oxide, bismuth vanadate, anthraquinone, perylene, and quinacridone. Examples of tints include pigments dispersed in water-based or water-miscible carriers such as Aqua-Chem® 896 (available from Degussa, Inc.), CHARISMA COLORANTS and MAXITONER INDUSTRIAL COLORANTS (available from Accurate Dispersions division of Eastman Chemical, Inc.).

In certain embodiments, compositions provided by the present disclosure comprise from about 2 wt % to about 14 wt % of carbon black, from about 4 wt % to about 12 wt % carbon black, from about 6 wt % to about 11 wt % carbon black, from about 6 wt % to about 10 wt % carbon black, and in certain embodiments, from about 6.6 wt % to about 9.5 wt % carbon black.

As noted above, a colorant may be in the form of a dispersion including, for example, a nanoparticle dispersion. Nanoparticle dispersions may include one or more highly dispersed nanoparticle colorants and/or colorant particles that produce a desired visible color and/or opacity and/or visual effect. Nanoparticle dispersions may include colorants such as pigments or dyes having a particle size of less than 150 nm, such as less than 70 nm, or less than 30 nm. Nanoparticles may be produced by milling stock organic or inorganic pigments with grinding media having a particle size of less than 0.5 mm. Examples of nanoparticle dispersions and methods for making them are disclosed in U.S. Pat. No. 6,875,800. Nanoparticle dispersions may also be produced by crystallization, precipitation, gas phase condensation, and/or chemical attrition (i.e., partial dissolution). To minimize re-agglomeration of nanoparticles within the coating, a dispersion of resin-coated nanoparticles may be used. As used herein, a "dispersion of resin-coated nanoparticles" refers to a continuous phase in which are dispersed discreet "composite microparticles" that comprise a nanoparticle and a resin coating on the nanoparticle. Examples of dispersions containing resin-coated nanoparticles and methods for making them are disclosed in U.S. Pat. No. 7,438,972.

Examples of special-effect compositions that may be used in compositions provided by the present disclosure include pigments and/or compositions that produce one or more appearance effects such as reflectance, pearlescence, metallic sheen, phosphorescence, fluorescence, photochromism, photosensitivity, thermochromism, goniochromism, and/or color-change. Additional special-effect compositions can provide other perceivable properties, such as opacity or texture. In certain embodiments, special-effect compositions may produce a color shift, such that the color of a composition changes when the coating is viewed at different angles. Examples of color-effect compositions are disclosed in U.S. Pat. No. 6,894,086. Additional color effect compositions may include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air. In general, a colorant may comprise from 1 wt % to 65 wt % of a composition, from 2 wt % to 50 wt %, such as from 3 wt % to 40 wt %, or from 5 wt % to 35 wt %, with weight percent based on the total dry weight of the composition.

Thixotropes, for example, silica, may be used in an amount from 0.1 wt % to 5 wt %, based on the total dry weight of the composition.

Accelerants may be present in an amount from 0.1 to 5 weight percent, based on the total weight of the composition. Examples of suitable accelerants include 1,4-diaza-bicyclo [2.2.2]octane (DABCO®, Air Products, Chemical Additives Division) and DMP-30® (an accelerant composition including 2,4,6-tris(dimethylaminomethyl)phenol).

Adhesion promoters may be present in amount from 0.1 wt % to 15 wt % of a composition, based on the total dry weight of the composition. Examples of adhesion promoters include phenolics, such as Methylon® phenolic resin (available from Occidental Chemicals), and organosilanes, such as epoxy, mercapto or amino functional silanes, such as Silquest® A-187 and Silquest® A-1100 (available from Momentive Performance Materials).

Masking agents, such as pine fragrance or other scents, which may be useful in masking any low level odor of the composition, may be present in an amount from 0.1 wt % to 1 wt %, based on the total dry weight of the composition.

In certain embodiments, compositions provided by the present disclosure may comprise a plasticizer that may facilitate the use of prepolymers having a higher glass transition temperature, $T_g$, than would ordinarily be useful in an aerospace sealant. For example, use of a plasticizer may effectively reduce the $T_g$ of a composition, and thereby increase the low-temperature flexibility of the cured polymerizable composition beyond that which would be expected on the basis of the $T_g$ of the prepolymers alone. Plasticizers suitable in certain embodiments of the compositions include, for example, phthalate esters, chlorinated paraffins, and hydrogenated terphenyls. A plasticizer or combination of plasticizers may constitute from 1 wt % to 40 wt % of a composition, or from 1 wt % to 10 wt % of a composition. In certain embodiments, a composition may comprise one or more organic solvents, such as isopropyl alcohol, in an amount, for example, from 0 wt % to 15 wt %, from 0 wt % to 10 wt %, or from 0 wt % to 5 wt %, based on the non-dry weight of the composition.

In certain embodiments, compositions provided by the present disclosure comprise one or more additional sulfur-containing polymers. A sulfur-containing polymer can be any polymer having at least one sulfur atom in the repeating unit, including polymeric thiols, polythiols, thioethers, polythioethers, polyformals, and polysulfides. A "thiol," as used herein, refers to a compound comprising a thiol or mercaptan group, that is, an —SH group, either as the sole functional group or in combination with other functional groups, such as hydroxyl groups, as is the case with, for example, thioglycerols. A polythiol refers to such a compound having more than one —SH group, such as a dithiol or higher functionality thiol. Such groups are typically terminal and/or pendant such that they have a active hydrogen that is reactive with other functional groups. As used herein, the term "polysulfide" refers to any compound that comprises a sulfur-sulfur linkage (—S—S—). A polythiol can comprise both a terminal and/or pendant sulfur (—SH) and a non-reactive sulfur atom (—S— or —S—S—). Thus, the term polythiol generally encompasses polythioethers and polysulfides. Examples of additional sulfur-containing polymers suitable in compositions provided by the present disclosure include, for example, those disclosed in U.S. Pat. Nos. 6,172,179, 6,509,418, 7,009,032, 7,879,955.

In certain embodiments, compositions provided by the present disclosure comprise a polythioether comprising the structure:

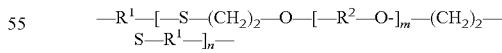

wherein $R^1$ is selected from a $C_{2-6}$ alkanediyl, $C_{6-8}$ cycloalkanediyl, $C_{6-10}$ cycloalkylalkanediyl, —[(—CH$_2$—)$_p$—X'—]$_q$—(CH$_2$—)$_r$—, and —[(CH$_2$—)$_p$—X'—]$_q$—(—CH$_2$—)$_r$— in which at least one —CH$_2$— unit is substituted with a methyl group; $R^2$ is selected from $C_{2-6}$ alkanediyl, $C_{6-8}$ cycloalkanediyl, $C_{6-10}$ cycloalkylalkanediyl, and —[(—CH$_2$—)$_p$—X'—]$_q$—(—CH$_2$—)$_r$—; X' is selected from —O—, —S—, and —NR$^6$—, where $R^6$ is selected from hydrogen and methyl; m is an integer selected from 0 to 10; n is an integer selected from 1 to 60; p is an integer selected from 2 to 6; q is an integer selected from 1 to 5, and r is an integer selected from 2 to 10. Such polythioethers are described, for example, in U.S. Pat. No. 6,172,179. The one or more additional sulfur-containing polymers may be difunctional or multifunctional, for example, having from 3 to 6 terminal groups, or a mixture thereof. In certain embodiments, such additional sulfur-containing polymers are amine-terminated and in certain embodiments, aromatic amine-terminated.

In certain embodiments, compositions provided by the present disclosure comprise from 10 wt % to 90 wt % of a flexible amine-terminated, sulfur-containing polymer provided by the present disclosure, from 20 wt % to 80 wt %, from 30 wt % to 70 wt %, and in certain embodiments from 40 wt % to 60 wt %, where wt % is based on the total weight of all non-volatile components of the composition (i.e., the dry weight). In certain embodiments, compositions provided by the present disclosure comprise from 10 wt % to 90 wt % of a flexible amine-terminated, sulfur-containing polymer provided by the present disclosure, from 20 wt % to 90 wt %, from 30 wt % to 90 wt %, from 40 wt % to 90 wt %, from 50 wt % to 90 wt %, from 60 wt % to 90 wt %, from 70 wt % to 90 wt %, and in certain embodiments from 80 wt % to 90 wt %, where wt % is based on the total weight of all non-volatile components of the composition (i.e., the dry weight).

In certain embodiments, compositions provided by the present disclosure comprise at least one filler that is effective in reducing the specific gravity of the composition. In certain embodiments, the specific gravity of a composition is from about 0.5 to about 1.1, from about 0.8 to about 1, about 0.7 to about 0.9, from about 0.75 to about 0.85, and in certain embodiments, is about 0.8. Suitable fillers for decreasing the specific gravity of the composition include, for example, hollow microspheres such as Expancel® microspheres (available from AkzoNobel) or Dualite® low-density polymer microspheres (available from Henkel). In certain embodiments, compositions provided by the present disclosure comprise from about 1 wt % to about 12 wt % of a low specific gravity filler such as, for example, Dualite E130-095D04, from about 2 wt % to about 10 wt %, from about 4 wt % to about 8 wt %, and in certain embodiments, from about 4.4 wt % to about 7.7 wt %.

In certain embodiments, compositions provided by the present disclosure comprise one or more curing agent. Curing agents suitable in compositions provided by the present disclosure include compounds that are reactive with the terminal amine groups of the sulfur-containing adducts disclosed herein, such as isocyanates. Examples of suitable curing agents that are reactive with amine groups include polymeric polyisocyanates, non-limiting examples of which include in addition to the isocyanate-terminated prepolymers disclosed herein, polyisocyanates having backbone groups chosen from urethane groups (—NH—C(O)—O—), thiourethane groups (—NH—C(O)—S—), thiocarbamate groups (—NH—C(S)—O—), dithiourethane linkages (—NH—C(S)—S—), and combinations of any of the foregoing.

In certain embodiments, compositions provided by the present disclosure are substantially free or, in some cases, completely free, of any solvent, such as an organic solvent or an aqueous solvent, i.e., water. Stated differently, in certain embodiments, compositions provided by the present disclosure are substantially 100% solids.

In certain embodiments, compositions provided by the present disclosure comprise from about 65 wt % to about 95 wt % of a polyisocyanate prepolymer, from about 70 wt % to about 90 wt %, from about 75 wt % to about 85 wt %, and in certain embodiments, from about 75.6 wt % to about 83.4 wt % of a polyisocyanate prepolymer.

In certain embodiments, compositions provided by the present disclosure comprise from about 1 wt % to about 12 wt % of a polyamine, from about 2 wt % to about 10 wt %, from about 4 wt % to about 9 wt %, from about 5 wt % to about 8 wt %, and in certain embodiments, from about 5.3 wt % to about 7.9 wt % of a polyamine.

In certain embodiments, compositions provided by the present disclosure comprise from about 2 wt % to about 8 wt % of an aromatic polyamine and from about 0 wt % to about 5 wt % of an aromatic amine-terminated polythioether, from about 4 wt % to about 7 wt % of an aromatic polyamine and from about 0 wt % to about 4 wt % of an aromatic amine-terminated polythioether, and in certain embodiments from about 4.7 wt % to about 6.4 wt % of an aromatic polyamine and from about 0 wt % to about 3.2 wt % of an aromatic amine-terminated polythioether.

In certain embodiments, compositions provided by the present disclosure comprise: from about 65 wt % to about 95 wt % of a polyisocyanate prepolymer and from about 1 wt % to about 12 wt % of a polyamine; from about 70 wt % to about 90 wt % of a polyisocyanate prepolymer and from about 2 wt % to about 10 wt %; from about 75 wt % to about 85 wt % of a polyisocyanate prepolymer and from about 4 wt % to about 9 wt %; and in certain embodiments, from about 75.6 wt % to about 83.4 wt % of a polyisocyanate prepolymer and from about 5.3 wt % to about 7.9 wt % of a polyamine.

In certain embodiments, compositions provided by the present disclosure comprise: from about 65 wt % to about 95 wt % of a polyisocyanate prepolymer and from about 2 wt % to about 8 wt % of an aromatic polyamine and from about 0 wt % to about 5 wt % of an aromatic amine-terminated polythioether; from about 70 wt % to about 90 wt % of a polyisocyanate prepolymer and from about 4 wt % to about 7 wt % of an aromatic polyamine and from about 0 wt % to about 4 wt % of an aromatic amine-terminated polythioether; from about 75 wt % to about 85 wt % of a polyisocyanate prepolymer and from about 4 wt % to about 7 wt % of an aromatic polyamine and from about 0 wt % to about 4 wt % of an aromatic amine-terminated polythioether; and in certain embodiments, from about 75.6 wt % to about 83.4 wt % of a polyisocyanate prepolymer and from about 4.7 wt % to about 6.4 wt % of an aromatic polyamine and from about 0 wt % to about 3.2 wt % of an aromatic amine-terminated polythioether.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wetability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

In certain embodiments, compositions, such as sealants, may be provided as multi-pack compositions, such as two-pack compositions, wherein one package comprises one or more polyisocyanate prepolymers provided by the present disclosure and a second package comprises one or more polyamines including one or more aromatic polyamines and/or one or more amine-terminated polythioethers provided by the present disclosure. Additives and/or other materials may be added to either package as desired or necessary. The two packages may be combined and mixed prior to use. In certain embodiments, the pot life of the one or more mixed prepolymers and polyamines is at least about 10 minutes, at least about 15 minutes, at least about 30 minutes, at least about 60 minutes, and in certain embodiments, at least about 2 hours, where pot life refers to the period of time the mixed composition remains suitable for use as a sealant after mixing. In certain embodiments, the pot life is from about 15 minute to about 60 minutes. Pot life refers to the time that a composition remains pourable after mixing. In certain embodiments, a composition is pourable when the viscosity at 25° C. (Brookfiled at 6 rpm) is from about 500 centipoise (cps) to about 15,000 cps, less than about 10,000 cps, and in certain embodiments, is less than about 5,000 cps. A composition is pourable when it can be poured from a container for use.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process known to those of ordinary skill in the art.

In certain embodiments, compositions provided by the present disclosure may be used in aircraft and aerospace sealants including, for example, sealants for sealing apertures and for sealing fuel tanks.

In certain embodiments, cured compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, §3.1.1 etc., available from SAE (Society of Automotive Engineers)).

In certain embodiments, compositions provide a cured product, such as a sealant, exhibiting an elongation of at least 100% and a tensile strength of at least 400 psi when measured in accordance with the procedure described in AMS 3279, §3.3.17.1, test procedure AS5127/1, §7.7.

In certain embodiments, compositions provide a cured product, such as a sealant, that exhibits a lap shear strength of greater than 200 psi and in some cases at least 400 psi when measured according to the procedure described in SAE AS5127/1 paragraph 7.8.

In certain embodiments, a cured sealant comprising a composition provided by the present disclosure meets or exceeds the requirements for aerospace sealants as set forth in AMS 3277.

Furthermore, methods are also provided for sealing an aperture utilizing a composition provided by the present disclosure. These methods comprise, for example, applying a composition provided by the present disclosure to a surface to seal an aperture, and curing the composition. In certain embodiments, a composition may be cured under ambient conditions, where ambient conditions refers to a temperature from 20° C. to 25° C., and atmospheric humidity.

In certain embodiments, a composition may be cured under conditions encompassing a temperature from a 0° C. to 100° C. and humidity from 0% RH to 100% RH. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation such as ultraviolet radiation. As will also be appreciated, the methods may be used to seal apertures on aerospace vehicles including aircraft and aerospace vehicles.

Embodiments provided by the present disclosure are further illustrated by reference to the following examples, which describe the synthesis, properties, and uses of certain polyurea compositions. It will be apparent to those skilled in the art that many modifications, both to materials, and methods, may be practiced without departing from the scope of the disclosure.

EXAMPLE 1

Polyformal Polyol

Thiodiglycol (1,833 g), paraformaldehyde (95% purity) (360 g), Amberlyst™ 15 (319 g, available from Dow Chemical Company), and toluene (1,000 mL) were charged into a 5-L, 4-neck, round-bottom flask. The flask was equipped with a heating mantle, thermocouple, temperature controller, and a Dean-Stark adapter fitted with a reflux condenser, dropping funnel, and an inlet for nitrogen positive pressure. The reactants were stirred under nitrogen, heated to 118° C., and maintained at 118° C. for ca. 7 h. During this period, collected water was periodically removed from the Dean-Stark adapter. The reaction mixture was then cooled to room temperature and filtered through a coarse-fritted Buchner funnel (600 mL volume) with a 9.0 cm diameter Whatman GF/A filter paper over the frit. The flask and filter cake were washed with 500 mL toluene. A filtrate was obtained. The filtrate was then dried in vacuo using a 2-L round bottomed flask (rotary evaporator, 7 torr final vacuum, 90° C. water bath) to provide a yellow, viscous polymer (1,456 g). The resulting thiodiglycol polyformal polyol had a hydroxyl number of 34.5 and a viscosity of 92 poise.

EXAMPLE 2

$H_{12}$MDI-Terminated Polyformal-Isocyanate Prepolymer

The thiodiglycol polyformal polyol of Example 1 (450 g) was charged into a 1,000-mL, 4-neck, round-bottom flask.

The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of Desmodur® W ($H_{12}$MDI) (99.5 g) and a 0.01% solution of dibutyltin dilaurate dissolved in methyl ethyl ketone (5.50 g). The reaction mixture was maintained at 76.6° C. for 7 h and then cooled to room temperature. A 1% solution of benzoyl chloride dissolved in methyl ethyl ketone (5.50 g) was then added to the reaction mixture. The resulting thiodiglycol polyformal-isocyanate prepolymer had an isocyanate content of 3.73% and a viscosity of 356 poise.

EXAMPLE 3

HDI-Uretidione-Terminated Polyformal-Isocyanate Prepolymer

The thiodiglycol polyformal polyol of Example 1 (101 g) was charged into a 500-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of Desmodur® XP-2730 (HDI-uretidione aliphatic polyisocyanate) (33.4 g) and a 0.01% solution of dibutyltin dilaurate dissolved in methyl ethyl ketone (1.4 g). The reaction mixture was maintained at 76.6° C. for ca. 7 h and then cooled to room temperature. A 1% solution of benzoyl chloride dissolved in methyl ethyl ketone (1.4 g) was then added to the reaction mixture. The resulting prepolymer had an isocyanate content of 3.41% and a viscosity of 695 poise.

EXAMPLE 4

HDI-Uretidione-Terminated Polyformal-Isocyanate Prepolymer

The thiodiglycol polyformal polyol of Example 1 (400 g) was charged into a 1,000-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of Desmodur® N-3400 (137 g) and a 0.01% solution of dibutyltin dilaurate dissolved in methyl ethyl ketone (5.50 g). The reaction mixture was maintained at 76.6° C. for ca. 7 h and then cooled to room temperature. A 1% solution of benzoyl chloride dissolved in methyl ethyl ketone (5.5 g) was then added to the reaction mixture. The resulting thiodiglycol polyformal-isocyanate prepolymer had an isocyanate content of 3.31% and a viscosity of 697 poise.

EXAMPLE 5

HDI-Uretidione-Terminated Polyformal-Isocyanate Prepolymer

The thiodiglycol polyformal polyol of Example 1 (504 g) was charged into a 1,000-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of Desmodur® N-3400 (521 g) and a 0.01% solution of dibutyltin dilaurate dissolved in methyl ethyl ketone (10.3 g). The reaction mixture was maintained at 76.6° C. for ca. 7 h and then cooled to room temperature. A 1% solution of benzoyl chloride dissolved in methyl ethyl ketone (10.4 g) was then added to the reaction mixture. The resulting thiodiglycol polyformal-isocyanate prepolymer had an isocyanate content of 8.94% and a viscosity of 46 poise.

EXAMPLE 6

Isophorone-Terminated Polyformal-Isocyanate Prepolymer

The thiodiglycol polyformal polyol of Example 1 (325 g) was charged into a 500-mL, 4-neck, round-bottom flask. The flask was equipped with a mantle, thermocouple, temperature controller, an inlet for providing nitrogen positive pressure, and a mechanical stirrer (PTFE paddle and bearing). The polyformal polyol was stirred at ca. 200 rpm and heated to 76.6° C. (170° F.), followed by the addition of Desmodur®I (62.5 g) (IPDI) and a 0.01% solution of dibutyltin dilaurate dissolved in methyl ethyl ketone (4 g). The reaction mixture was maintained at 76.6° C. for ca. 7 h and then cooled to room temperature. A 1% solution of benzoyl chloride dissolved in methyl ethyl ketone (4 g) was then added to the reaction mixture. The resulting thiodiglycol polyformal-isocyanate prepolymer had an isocyanate content of 3.51% and a viscosity of 229 poise.

EXAMPLE 7

$H_{12}$MDI-Terminated Polythioether-Isocyanate Prepolymer

A thiol-terminated polythioether was prepared according to Example 1 of U.S. Pat. No. 6,172,179. In a 2-L flask, 524.8 g (3.3 mol) of diethylene glycol divinyl ether (DEG-DVE) and 706.7 g (397 mol) of dimercaptodioxaoctane (DMDO) were mixed with 19.7 g (0.08 mol) of triallylcyanurate (TAC) and heated to 77° C. To the reaction mixture was added 4.6 g (0.024 mol) of an azobisnitrile free radical catalyst (VAZO®67, 2,2'-azobis(2-methylbutyronitrile)). The reaction proceeded substantially to completion after 2 to afford 1,250 g (0.39 mol, yield 100%) of a liquid thiol-terminated polythioether resin having a $T_g$ of −68° C. and a viscosity of 65 poise. The resin was faintly yellow and had low odor.

A 1-liter, 4-neck round-bottomed flask was fitted with a mantle, thermocouple, temperature controller, nitrogen line, mechanical stirrer and dropping funnel. The flask was charged with a thiol-terminated polythioether (652.3 g) prepared according to Example 1 of U.S. Pat. No. 6,172,179. The flask was heated to 71° C. under nitrogen and stirred at 300 rpm. A mixture of 4-hydroxybutyl vinyl ether (47.40 g) and Vazo-67 (1.19 g) was added to the flask in 1 h via a dropping funnel. The reaction mixture was maintained at 71° C. for ca. 41 h, at which time the reaction was complete. After this, the reaction apparatus was then fitted with a vacuum line and the product heated to 94° C. Heating was continued for 1.3 h under vacuum. Following vacuum treatment, a pale yellow, viscous polythioether polyol (678.80 g) was obtained. The polythioether polyol had a hydroxyl number of 31.8 and a viscosity of 77 Poise.

The polythioether polyol (300.03 g) was then charged into a 500-mL, 4-neck, round-bottom flask. The flask was equipped with a mantle, thermocouple, temperature controller, an inlet for providing nitrogen positive pressure, and a mechanical stirrer (PTFE paddle and bearing). The polythioether polyol was stirred at ca. 200 rpm and heated to 76.6° C. (170° F.), followed by the addition of Desmodur® W (H$_{12}$MDI) (82.90 g) and a 0.01% solution of dibutyltin dilaurate dissolved in methyl ethyl ketone (3.90 g). The reaction mixture was maintained at 76.6° C. for ca. 7 h and then cooled to room temperature. A 1% solution of benzoyl chloride dissolved in methyl ethyl ketone (3.80 g) was then added to the reaction mixture. The resulting H$_{12}$MDI-terminated polythioether prepolymer had an isocyanate content of 4.47% and a viscosity of 282 poise.

EXAMPLE 8

Acrylate-Terminated Polyformal Polymer

The sulfur-containing polymer of Example 1 (164.3 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of isocyanatoethyl methacrylate (10.1 g) and a 0.01% solution of dibutyltin dilaurate dissolved in methyl ethyl ketone (1.7 g). The reaction mixture was maintained at 76.6° C. for 5 h and then cooled to room temperature. A 1% solution of benzoyl chloride dissolved in methyl ethyl ketone (1.8 g) was then added to the reaction mixture. The resulting polymer had a viscosity of 177 poise.

EXAMPLE 9

Allyl-Terminated Polyformal Polymer

The sulfur-containing polymer in Example 1 (143.1 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of allyl isocyanate (4.8 g) and a 0.01% solution of dibutyltin dilaurate dissolved in methyl ethyl ketone (1.5 g). The reaction mixture was maintained at 76.6° C. for 5 h and then cooled to room temperature. The resulting polymer had a viscosity of 176 poise.

EXAMPLE 10

TMI-Terminated Polyformal Polymer

The sulfur-containing polymer in Example 1 (150.9 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of 3-isopropenyl-α,α-dimethylbenzyl isocyanate (12.7 g, available from Cytec Industries) and a 0.01% solution of dibutyltin dilaurate dissolved in methyl ethyl ketone (1.63 g). The reaction mixture was maintained at 76.6° C. for 6 h and then cooled to room temperature. The resulting polymer had a viscosity of 291 poise.

EXAMPLE 11

Synthesis of Trifunctional Polyformal Polyol

Thiodiglycol (1,215.81 g), paraformaldehyde (95% purity) (300.63 g), Amberlyst™ 15 (212.80 g, Dow Chemical Company), 1,3,5-tris(2-hydroxyethyl) isocyanurate (13.14 g, Aldrich), and toluene (500 mL) were charged in a 3-liter, 4-neck round-bottom flask. The flask was equipped with a heating mantle, thermocouple, temperature controller, and a Dean-Stark adapter fitted with a reflux condenser, a dropping funnel and an inlet for nitrogen positive pressure. During this period, collected water was periodically removed from the Dean-Stark adapter. Stirring was started under nitrogen and the batch was heated to 120° C. and maintained at 120° C. for about 10 h. The reaction mixture was then cooled to room temperature and filtered with suction through a coarse-fritted Buchner funnel (600 mL volume) with a 9.0 cm-diameter Whatman GF/A filter paper over the frit. The flask and filter cake were washed with 500 mL toluene. A filtrate was obtained. The filtrate was then stripped in vacuo using a 2-L round bottomed flask (rotary evaporator, 5 torr final vacuum, 90° C. water bath). A yellow, viscous polymer (993.53 g) was obtained. The resulting polyformal polymer had a hydroxyl number of 25.3 and a viscosity of 214 poise.

EXAMPLE 12

Synthesis of Trifunctional Polyformal Polyol

Thiodiglycol (1,209.67 g), paraformaldehyde (95% purity) (300.48 g), Amberlyst™ 15 (26.18 g, Dow Chemical Company), 1,3,5-tris(2-hydroxyethyl) isocyanurate (20.9 g, Aldrich), and toluene (500 mL) were charged in a 3-liter, 4-neck round-bottom flask. The flask was equipped with a heating mantle, thermocouple, temperature controller, and a Dean-Stark adapter fitted with a reflux condenser, a dropping funnel and an inlet for nitrogen positive pressure. During this period, collected water was periodically removed from the Dean-Stark adapter. Stirring was started under nitrogen and the batch was heated to 120° C. and maintained at 120° C. for about 10 h. The reaction mixture was then cooled to room temperature and filtered with suction through a coarse-fritted Buchner funnel (600 mL volume) with a 9.0 cm diameter Whatman GF/A filter paper over the frit. The flask and filter cake were washed with 500 mL toluene. A filtrate was obtained. The filtrate was then stripped in vacuo using a 2-L round bottomed flask (rotary evaporator, 5 torr final vacuum, 90° C. water bath). A yellow, viscous polymer (953.33 g) was obtained. The resulting polyformal polymer had a hydroxyl number of 22.8 and a viscosity of 377 poise.

EXAMPLE 13

Synthesis of Trifunctional Polyformal Polyol

Thiodiglycol (1,197.45 g), paraformaldehyde (95% purity) (300.83 g), Amberlyst™ 15 (213.06 g, Dow Chemical Company), 1,3,5-tris(2-hydroxyethyl) isocyanurate (52.58 g, Aldrich) and toluene (500 mL) were charged in a 3-liter, 4-neck round-bottom flask. The flask was equipped with a heating mantle, thermocouple, temperature controller, and a Dean-Stark adapter fitted with a reflux condenser, a dropping funnel and an inlet for nitrogen positive pressure. During this period, collected water was periodically removed from the Dean-Stark adapter. Stirring was started under nitrogen and the batch was heated to 120° C. and maintained at 120° C. for about 10 h. The reaction mixture was then cooled to room temperature and filtered with suction through a coarse-fritted Buchner funnel (600 mL volume) with a 9.0 cm-diameter Whatman GF/A filter paper over the frit. The flask and filter cake were washed with 500 mL toluene. A filtrate was obtained. The filtrate was then stripped in vacuo using a 2-L round bottomed flask (rotary evaporator, 5 torr final vacuum, 90° C. water bath). A yellow, viscous polymer (1,039.64 g) was obtained. The resulting polyformal polymer had a hydroxyl number of 23.2 and a viscosity of 942 poise.

EXAMPLE 14

Acrylate-Terminated Trifunctional Polyformal Polyol

The polyformal polymer of Example 11 (222.40 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of isocyanatoethyl methacrylate (15.68 g) and a 0.05% solution of dibutyltin dilaurate dissolved in methyl ethyl ketone (2.51 g). The reaction mixture was maintained at 76.6° C. for 5 h and then cooled to room temperature. The resulting acrylate-terminated polymer (222.08 g) had a viscosity of 299 poise.

EXAMPLE 15

Acrylate-Terminated Trifunctional Polyformal Polyol

The polyformal polymer of Example 12 (247.26 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of isocyanatoethyl methacrylate (15.61 g) and a 0.05% solution of dibutyltin dilaurate dissolved in methyl ethyl ketone (2.66 g). The reaction mixture was maintained at 76.6° C. for 5 h and then cooled to room temperature. The resulting acrylate-terminated polymer (242.14 g) had a viscosity of 439 poise.

EXAMPLE 16

Acrylate-Terminated Trifunctional Polyformal Polyol

The polyformal polymer of Example 13 (243.71 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of isocyanatoethyl methacrylate (15.58 g) and a 0.05% solution of dibutyltin dilaurate dissolved in methyl ethyl ketone (2.74 g). The reaction mixture was maintained at 76.6° C. for 5 h and then cooled to room temperature. The resulting acrylate-terminated polymer (226.09 g) had a viscosity of 1,026 poise.

EXAMPLE 17

TMI-Terminated Trifunctional Polyformal Polyol

The polyformal polymer in Example 11 (222.6 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of 3-isopropenyl-α,α,-dimethyl-benzyl isocyanate (TMI) (20.25 g, Cytec Industries) and a 0.05% solution of dibutyltin dilaurate dissolved in methyl ethyl ketone (2.47 g). The reaction mixture was maintained at 76.6° C. for 6 h and then cooled to room temperature. The resulting TMI-terminated polymer (217.32) had a viscosity of 378 poise.

EXAMPLE 18

TMI-Terminated Trifunctional Polyformal Polyol

The polyformal polymer in Example 11 (243.70 g) was charged into a 500-mL, 4-neck round-bottom flask. The flask was equipped with a mantle, thermocouple, temperature controller, an inlet for nitrogen positive pressure, and a mechanical stirrer (PTFE paddle and bearing). The polymer was stirred at ca. 200 rpm and heated to 76.6° C. (170° F.), followed by the addition of 3-isopropenyl-α,α,-dimethyl-benzyl isocyanate (20.18 g, Cytec Industries) and a 0.05% solution of dibutyltin dilaurate dissolved in methyl ethyl ketone (2.62 g). The reaction mixture was maintained at 76.6° C. for 6 h and then cooled to room temperature. The resulting TMI-terminated polymer (230.42 g) had a viscosity of 1.261 poise.

EXAMPLE 19

Isophorone Diisocyanate-Terminated Polythioether Polymer

Permapol® 3.1E (756.50 g, PRC-Desoto Inc, Sylmar, Calif.) was charged into in a 1,000-mL, 4-neck round-bottom flask. The flask was equipped with a mantle, thermocouple, temperature controller, inlet for nitrogen positive pressure, and a mechanical stirrer (PTFE paddle and bearing). The polymer was stirred at ca. 200 rpm and heated to 76.6° C. (170° F.) under vacuum for one hour. The polymer was then cooled to room temperature, followed by the addition of Desmodur® I (IPDI) (130.16 g) and Polycat® 8 (0.11 g, Air Products and Chemicals, Inc., Allentown, Pa.). The reaction mixture was maintained at room temperature for 1.5 h. Benzoyl chloride (0.035 g) was then added to the reaction mixture. The resulting polymer had an isocyanate content of 3.26% and a viscosity of 610 poise.

EXAMPLE 20

TDI-Terminated Polythioether Polymer

Permapol® 3.1E (756.50 g, PRC-Desoto Inc, Sylmar, Calif.) was charged into in a 1,000-mL, 4-neck, round-bottom flask. The flask was equipped with a mantle, thermocouple, temperature controller, inlet for nitrogen positive pressure, and a mechanical stirrer (PTFE paddle and bearing). The polymer was stirred at ca. 200 rpm and heated to 76.6° C. (170° F.) under vacuum for one hour. The polymer was then cooled to room temperature, followed by the addition of toluene diisocyanate (TDI) (102.29 g) and Polycat® 8 (0.030 g, Air Products and Chemicals, Inc., Allentown, Pa.). The reaction mixture was maintained at room temperature for 1.5 h. Benzoyl chloride (0.054 g) was then added to the reaction mixture. The resulting polymer had an isocyanate content of 3.17% and a viscosity of 748 poise.

EXAMPLE 21

Amine-Terminated Polythioether Synthesis

Dimercaptodioxaoctane (DMDO) 253.4 g, 1.39 mole) was added to a 1 liter, 4-neck flask under a nitrogen atmosphere. While stirring, the contents of the flask were heated to 50° C. and 146.6 g (0.93 mole) of diethylene glycol divinyl ether (DEG-DVE) was added over 1 h. The temperature of the reaction mixture was increased to 70° C. and 0.05 g of free-radical initiator Vazo® 67 (2,2'-azobis(2-methylbutyronitrile), Du Pont) was added. The temperature of the reaction mixture was maintained at 70° C. for an additional hour. Completion of the reaction of DEG-DVE with DMDO was indicated by a mercaptan equivalent value of 420. Allyl glycidyl ether (AGE) (110.87 g, 0.97 mole, 2% stoichiometric excess) was added at 70° C. over 1 h and the reaction mixture was heated at 70° C. for an additional hour. Ten portions of Vazo® 67 (0.165 g each) were then added at 3 hr intervals at 70° C. Following the addition of Vazo® 67 the reaction mixture was heated at 70° C. for 5 h. The reaction mixture was then degassed at 70° C./4-5 mm Hg for 3 h to provide a liquid epoxy-terminated polythioether having a faint yellow color, a viscosity of 5.0 poise, and an epoxy equivalent value of 563. The reaction yield was 508.7 g (100%).

A 3 liter, 4-neck flask was charged with 1703.46 g (1.51 moles) of the epoxy-terminated polythioether and 647.49 g (3.02 moles) of Ethacure® 300 (Huntsman Inc.). The reactants were mixed under vacuum (10 mmHg) for 0.25 h. Polycat® 8 (0.47 g, 0.0037 mole) was added and the mixture heated at 84-92° C. for 10 h. The amine-terminated polythioether adduct was light brown in color and had a viscosity of 6 poise.

EXAMPLE 22

Composition of IPDI-Terminated Polythioether and Amine-Terminated Polythioether

The IPDI-terminated polythioether of Example 19 (57.76 g), carbon black (7.2 g, Cabot), Dualite® E130-095D04 (4.8 g, Henkel), Ethacure® 300 (3.6 g, Albemarle) and the amine-terminated polythioether adduct of Example 21 (2.4 g) were first mixed by hand and then mixed for 60 seconds at 2,3000 rpm in a speed mixer (DAC 600 FVZ).

EXAMPLE 23

Composition of IPDI-Terminated Polythioether and Aromatic Polyamine

The IPDI-terminated polythioether of Example 19 (63.2 g), carbon black (6.0 g, Cabot), Dualite® E130-095D04 (4.0 g, Henkel), and Ethacure® 300 (5.0 g, Albemarle) were first mixed by hand and then mixed for 60 seconds at 2,3000 rpm in a speed mixer (DAC 600 FVZ).

EXAMPLE 24

Composition of IPDI-Terminated Polythioether and Aromatic Polyamine

The IPDI-terminated polythioether of Example 19 (60.44 g), carbon black (4.8 g, Cabot), Dualite® E130-095D04 (3.2 g, Henkel), and Ethacure® 100 (4.0 g, Albemarle) were first mixed by hand and then mixed for 60 seconds at 2,3000 rpm in a speed mixer (DAC 600 FVZ).

EXAMPLE 25

Composition of IPDI-Terminated Polythioether and Amine-Terminated Polythioether

The IPDI-terminated polythioether of Example 19 (60.00 g), carbon black (7.2 g, Cabot), Dualite® E130-095D04 (6.0 g, Henkel), Ethacure® 300 (3.74 g, Albemarle) and the amine-terminated polythioether adduct of Example 21 (2.49 g) were first mixed by hand and then mixed for 60 seconds at 2,3000 rpm in a speed mixer (DAC 600 FVZ).

EXAMPLE 26

Composition of IPDI-Terminated Polythioether and Amine-Terminated Polythioether

The IPDI-terminated polythioether of Example 19 (60.00 g), carbon black (7.2 g, Cabot), Dualite® E130-095D04 (6.0 g, Henkel), Ethacure® 300 (4.75 g, Albemarle) and the amine-terminated polythioether adduct of Example 21 (2.4 g) were first mixed by hand and then mixed for 60 seconds at 2,3000 rpm in a speed mixer (DAC 600 FVZ).

EXAMPLE 27

Composition of IPDI-Terminated Polythioether and Aromatic Polyamine

The IPDI-terminated polythioether of Example 19 (60.00 g), carbon black (7.2 g, Cabot), Dualite® E130-095D04 (4.8 g, Henkel), and Ethacure® 100 (3.97 g, Albemarle) were first mixed by hand and then mixed for 60 seconds at 2,3000 rpm in a speed mixer (DAC 600 FVZ).

EXAMPLE 28

Composition of TDI-Terminated Polythioether and Aromatic Polyamine

The TDI-terminated polythioether of Example 20 (50.00 g), carbon black (6.0 g, Cabot), Dualite® E130-095D04 (4.0 g, Henkel), and Ethacure® 300 (3.85 g, Albemarle) were first mixed by hand and then mixed for 60 seconds at 2,3000 rpm in a speed mixer (DAC 600 FVZ).

EXAMPLE 29

Cured Compositions

A 12"×12" thin polyethylene sheet was placed on a flat 12"×12"×¼" stainless steel plate. Four 12"×1"×⅛" spacers were placed on the edges of the polyethylene sheet.

Each mixed composition in Examples 22 to 28 was uniformly poured onto the polyethylene sheet between the spacers. A second 12"×12" thin polyethylene sheet was placed on the top of the composition such that the second polyethylene sheet was separated from the first polyethylene sheet by the ⅛" spacers. A second 12"×12"×¼" stainless steel plate was placed on top of the second polyethylene sheet. The composition, sandwiched between two polyethylene sheets, was cured at room temperature for 48 hr, followed by 24 hours curing at 140° F. Finally, the polyethylene sheets were removed provide a flat, ⅛-in thick, cured polymer sheet.

The hardness, tensile strength and elongation (T/E), and tear strength data are shown in Table 1. The hardness of cured polymer was measured according to ASTM D2240, the tensile strength and elongation were measured according to ASTM D412, and the tear strength was measured according to ASTM D624 Die C.

Pot life is defined as the time from when the isocyanate and amine are first mixed to the time when the mixed composition no longer pourable.

The constituents for the compositions described in Examples 22-28 are summarized in Table 1. The properties of the cured compositions of Examples 22-28 are summarized in Table 2.

TABLE 1

| Example | Isocyanate Prepolymer | Resin Weight (gm | wt %) | Carbon Black (gm | wt %) | Dualite ® E130-095D04 (gm |wt%) | Ethacure ® 300 (gm | wt %) | Ethacure ® 100 (gm | wt %) | Amine-Terminated Polythioether (Example 21) (gm |wt %) |
|---|---|---|---|---|---|---|---|
| 22 | Example 19 | 57.8 | 76.3 | 7.2 | 9.5 | 4.8 | 6.3 | 3.6 | 4.7 | 0 | 0 | 2.4 | 3.2 |
| 23 | Example 19 | 63.2 | 80.8 | 6.0 | 7.7 | 4.0 | 5.1 | 5.0 | 6.4 | 0 | 0 | 0 | 0 |
| 24 | Example 19 | 60.4 | 83.4 | 4.8 | 6.6 | 3.2 | 4.4 | 0 | 0 | 4.0 | 5.5 | 0 | 0 |
| 25 | Example 19 | 60.0 | 75.6 | 7.2 | 9.1 | 6.0 | 7.6 | 3.7 | 4.7 | 0 | 0 | 2.5 | 3.1 |
| 26 | Example 19 | 60.0 | 77.0 | 7.2 | 9.2 | 6.0 | 7.7 | 4.7 | 6.0 | 0 | 0 | 0 | 0 |
| 27 | Example 19 | 60.0 | 78.9 | 7.2 | 9.5 | 4.8 | 6.3 | 0 | 0 | 4.0 | 5.3 | 0 | 0 |
| 28 | Example 20 | 50.0 | 78.4 | 6.0 | 9.4 | 4.0 | 6.3 | 3.8 | 6.0 | 0 | 0 | 0 | 0 |

TABLE 2

| Example | Density (g/cm³) | Dry T/E (psi/%) | JRF Immersed T/E (psi/%) | After 300° F./8 h exposure T/E (psi/%) | Volume swell and weight loss after JRF exposure % | Dry Hardness Rex A | Hardness after JRF exposure Rex A | Hardness after 300° F./8 h exposure, Rex A | Pot Life (min) |
|---|---|---|---|---|---|---|---|---|---|
| 22 | 0.74 | 365/576 | 375/340 | 305/133 | 12.0/0.76 | 50 | 54 | 45 | 60 |
| 23 | 0.78 | 390/715 | 510/597 | 213/124 | 12.8/0.79 | 52 | 48 | 45 | 30 |
| 24 | 0.83 | 988/481 | 453/231 | 357/165 | 14.5/0.06 | 70 | 65 | 62 | 15 |
| 25 | 0.69 | 353/527 | 314/310 | 264/125 | 11.8/1.23 | 50 | 46 | 40 | 60 |
| 26 | 0.70 | 364/596 | 421/526 | 192/125 | 11.6/0.87 | 55 | 50 | 42 | 60 |
| 27 | 0.75 | 842/498 | 442/242 | 325/134 | 13.2/1.06 | 69 | 65 | 58 | 15 |
| 28 | 0.74 | 533/282 | 362/178 | 127/30 | 11.1/0.37 | 67 | 60 | 54 | 15 |

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A composition comprising:
   (a) an isocyanate-terminated sulfur-containing polyformal prepolymer comprising the reaction product of reactants comprising:
   (i) a diisocyanate having a first isocyanate group and a second isocyanate group, wherein the reactivity of the first isocyanate group with a thiol group is greater than the reactivity of the second isocyanate group with the thiol group; and
   (ii) a thiol-terminated sulfur-containing polyformal, wherein the thiol-terminated sulfur-containing polyformal comprises a thiol-terminated sulfur-containing polyformal of Formula (9), a thiol-terminated sulfur-containing polyformal Formula (9'), or a combination thereof:

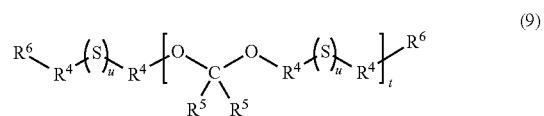

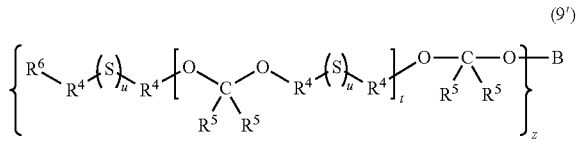

wherein:

t is an integer selected from 2 to 40;

each u is independently selected from 1 or 2;

each $R^4$ is independently selected from $C_{2-6}$ alkanediyl;

each $R^5$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, or substituted $C_{6-12}$ aryl; and each $R^6$ is a group comprising a terminal thiol group; and B represents a core of a z-valent polyol $B(OH)_z$ wherein z is an integer from 3 to 6;

wherein the molar ratio of isocyanate groups to thiol groups is from 2.1:1 to 2.5:1; and (b) a polyamine.

2. The composition of claim 1, wherein the molar ratio is 2.2:1.

3. The composition of claim 1, wherein the isocyanate-terminated sulfur-containing polyformal prepolymer is selected from a difunctional isocyanate-terminated sulfur-containing polyformal prepolymer of Formula (3), a multifunctional isocyanate-terminated sulfur-containing polyformal prepolymer of Formula (3'), or a combination thereof:

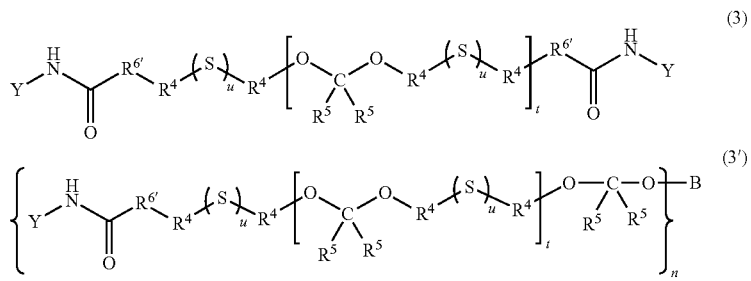

(3)

(3')

wherein:
t is an integer selected from 2 to 40;
each u is independently selected from 1 or 2;
each $R^4$ is independently selected from $C_{2-6}$ alkanediyl;
each $R^5$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, or substituted $C_{6-12}$ aryl;
each —$R^{6'}$— is selected from a moiety of Formula (a'), Formula (b'), Formula (c'), Formula (d'), Formula (e'), Formula (f'), Formula (g'), or Formula (h'):

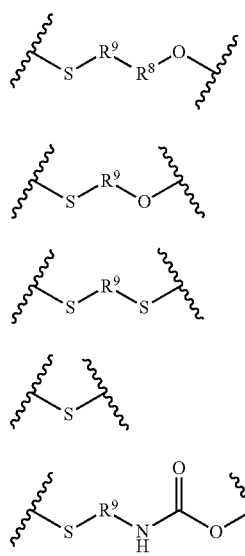

(a')

(b')

(c')

(d')

(e')

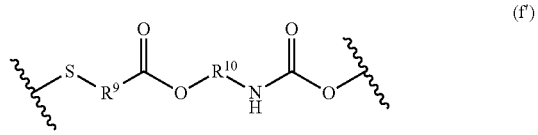

(f')

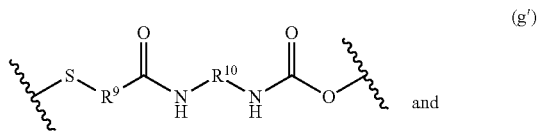

(g') and

-continued

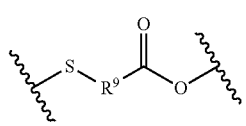

(h')

wherein:
each $R^8$ is selected from a moiety derived from a diisocyanate and a moiety derived from an ethylenically unsaturated monoisocyanate;
each $R^9$ is selected from $C_{2-14}$ alkanediyl or $C_{2-14}$ heteroalkanediyl; and
each $R^{10}$ is selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, or substituted $C_{4-18}$ alkanecycloalkanediyl;
B represents a core of a z-valent polyol $B(OH)_z$ wherein z is an integer from 3 to 6; and
each Y—NH—C(O)— is a moiety derived from the diisocyanate.

4. The composition of claim 3, wherein:
u is 1;
each $R^5$ is hydrogen; and
each $R^4$ is 1,2-ethanediyl.

5. The composition of claim 1, wherein the diisocyanate is selected from 2,4-toluene diisocyanate, isophorone diisocyanate, or a combination of any of the foregoing.

6. The composition of claim 1, wherein the composition comprises a metal acetylacetonate catalyst.

7. The composition of claim 1, wherein the composition comprises a base catalyst.

8. The composition of claim 7, wherein the base catalyst is selected from triethylamine, trioctylphosphine, or a combination thereof.

9. The composition of claim 1, wherein the thiol-terminated sulfur-containing polyformal comprises the reaction products of reactants comprising:
the reaction products of reactants comprising a sulfur-containing polyol and a first compound, wherein:
the sulfur-containing polyol is selected from a polyol of Formula (10), a polyol of Formula (10'), or a combination thereof:

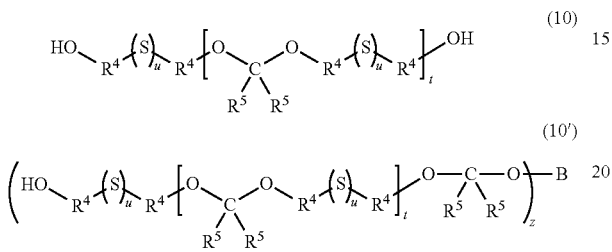

wherein:
t is an integer selected from 2 to 40;
each u is independently selected from 1 and 2;
each $R^4$ is independently selected from $C_{2-6}$ alkanediyl;
each $R^5$ is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, or substituted $C_{6-12}$ aryl; and
B represents a core of a z-valent polyol $B(OH)_z$ wherein z in an integer from 3 to 6; and
the first compound is selected from a diisocyanate, thiourea, an ethylenically unsaturated monoisocyanate, or a tosylate; and
a mercaptoalkanol when the first compound comprises a diisocyanate;
a metal hydrosulfide when the first compound comprises thiourea;
a dithiol when the first compound comprises an ethylenically unsaturated monoisocyanate; or
a metal hydrosulfide when the first compound comprises a tosylate.

10. The composition of claim 9, wherein the sulfur-containing polyformal polyol of Formula (10) comprises the reaction product of reactants comprising thiodiglycol and paraformaldehyde.

11. The composition of claim 9, wherein the sulfur-containing polyformal polyol of Formula (10') comprises the reaction product of reactants comprising thiodiglycol, paraformaldehyde and 1,3,5-tris(2-hydroxyethyl)isocyanurate.

12. The composition of claim 1, wherein each $R^6$ is independently a thiol-terminated group selected from a group of Formula (a), Formula (b), Formula (c), Formula (d), Formula (e), Formula (f), Formula (g), or Formula (h):

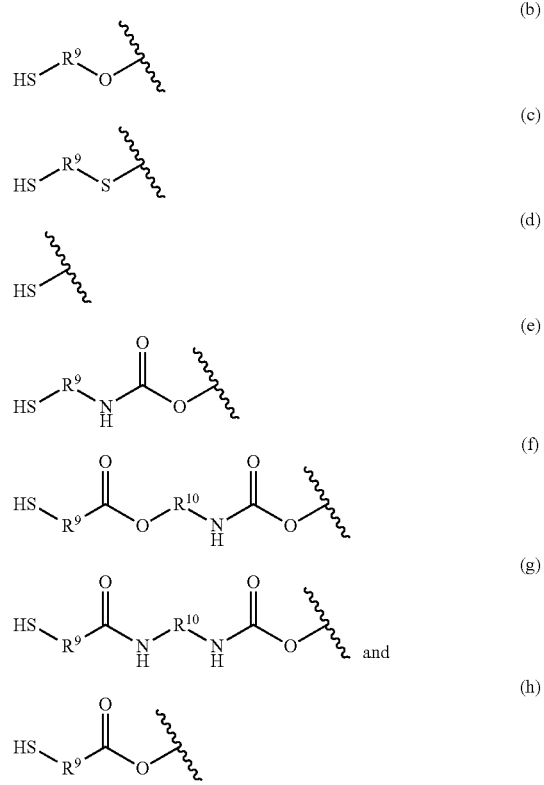

wherein:
each $R^8$ is selected from a moiety derived from a diisocyanate or a moiety derived from an ethylenically unsaturated monoisocyanate;
each $R^9$ is selected from $C_{2-14}$ alkanediyl or and $C_{2-14}$ heteroalkanediyl; and
each $R^{10}$ is selected from $C_{2-6}$ alkanediyl, $C_{2-6}$ heteroalkanediyl, $C_{6-12}$ arenediyl, substituted $C_{6-12}$ arenediyl, $C_{6-12}$ heteroarenediyl, substituted $C_{6-12}$ heteroarenediyl, $C_{3-12}$ cycloalkanediyl, substituted $C_{3-12}$ cycloalkanediyl, $C_{3-12}$ heterocycloalkanediyl, substituted $C_{3-12}$ heterocycloalkanediyl, $C_{7-18}$ alkanearenediyl, substituted $C_{7-18}$ heteroalkanearenediyl, $C_{4-18}$ alkanecycloalkanediyl, or substituted $C_{4-18}$ alkanecycloalkanediyl.

13. The composition of claim 1, wherein the polyamine comprises an aromatic polyamine.

14. The composition of claim 1, wherein the polyamine is selected from an aromatic polyamine, an aromatic amine-terminated polythioether adduct, or a combination thereof.

15. The composition of claim 14, wherein the aromatic amine-terminated polythioether adduct is selected from an adduct of Formula (13), an adduct of Formula (13'), or a combination thereof:

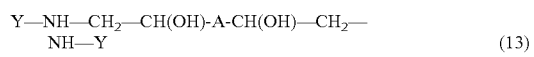

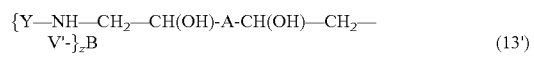

wherein:
A has the structure of Formula (15):

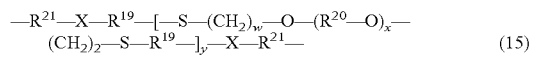

each $R^{19}$ is independently selected from $C_{2-10}$ alkanediyl, $C_{2-10}$ oxyalkanediyl, $C_{6-8}$ cycloalkanediyl, $C_{6-10}$ alkylcycloalkanediyl, or $-[-(CHR^3)_s-X'-]_q-(CHR^3)_r-$; wherein
  each $R^3$ is independently selected from hydrogen or and methyl;
  each $X'$ is independently selected from O, S, or $-NR-$ wherein R is selected from hydrogen or methyl;
  s is an integer from 2 to 6;
  q is an integer from 1 to 5; and
  r is an integer from 2 to 10;
each $R^{20}$ is independently selected from $C_{3-20}$ alkanediyl or $C_{3-20}$ oxyalkanediyl;
each w is independently an integer from 2 to 6;
each x is independently an integer from 0 to 50;
y is an integer from 1 to 60;
each X is independently selected from $-O-$, $-S-$, or $-NR-$, wherein R is selected from hydrogen or methyl;
each $R^{21}$ is independently selected from $C_{3-20}$ alkanediyl or $C_{3-20}$ oxyalkanediyl;
B represents the core of a z-valent polyfunctionalizing agent $B(V)_z$, wherein:
  z is an integer from 3 to 6; and
  each V comprises a terminal group that is reactive with an epoxy group;
each $-CH(OH)-CH_2-V'-$ comprises a moiety resulting from the reaction of V with an epoxy group; and
each $Y-NH-$ is derived from an aromatic polyamine, wherein the aromatic polyamine has the structure $Y-NH_2$.

16. The composition of claim 14, wherein the amine-terminated polythioether adduct comprises the reaction products of reactants comprising:
(a) an epoxy-terminated polythioether selected from an epoxy-terminated polythioether of Formula (15), an epoxy-terminated polythioether of Formula (15'), or a combination thereof:

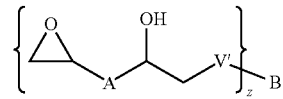

(15)

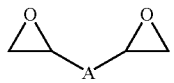

(15')

wherein:
A has the structure of Formula (15):

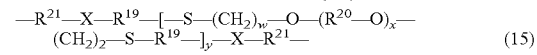

(15)

each $R^{19}$ is selected from $C_{2-10}$ alkanediyl, $C_{2-10}$ oxyalkanediyl, $C_{6-8}$ cycloalkanediyl, $C_{6-10}$ alkylcycloalkanediyl, or $-[-(CHR^3)_s-X'-]_q-(CHR^3)_r-$; wherein
  each $R^3$ is independently selected from hydrogen or and methyl;
  each $X'$ is independently selected from O, S, or $-NR-$ wherein R is selected from hydrogen and methyl;
  s is an integer from 2 to 6;
  q is an integer from 1 to 5; and
  r is an integer from 2 to 10;
each $R^{20}$ is independently selected from $C_{3-20}$ alkanediyl or $C_{3-20}$ oxyalkanediyl;
each w is independently an integer from 2 to 6;
each x is independently an integer from 0 to 50;
y is an integer from 1 to 60;
each X is independently selected from $-O-$, $-S-$, or $-NR-$, wherein R is selected from hydrogen and methyl;
each $R^{21}$ is independently selected from $C_{3-20}$ alkanediyl or $C_{3-20}$ oxyalkanediyl;
B represents the core of a z-valent polyfunctionalizing agent $B(V)_z$, wherein:
  z is an integer from 3 to 6; and
  V is a group comprising a terminal group that is reactive with an epoxy group; and
$-CH(OH)-CH_2-V'-$ comprises a moiety resulting from the reaction of V with an epoxy group; and
(b) an aromatic polyamine.

17. The composition of claim 1, formulated as a sealant.
18. The composition of claim 17, wherein the sealant is characterized by a specific gravity from 0.5 to 1.1.
19. An aperture sealed with the composition of claim 17.
20. A method of sealing an aperture, comprising:
applying the composition of claim 17 to one or more surfaces defining an aperture; and
curing the applied composition to seal the aperture.

* * * * *